United States Patent
Eda et al.

(10) Patent No.: US 7,439,477 B2
(45) Date of Patent: Oct. 21, 2008

(54) LASER CONDENSING OPTICAL SYSTEM

(75) Inventors: Yukio Eda, Tokyo (JP); Sadashi Adachi, Tokyo (JP)

(73) Assignee: Olympus Corporation, Tokyo (JP)

( * ) Notice: Subject to any disclaimer, the term of this patent is extended or adjusted under 35 U.S.C. 154(b) by 36 days.

(21) Appl. No.: 11/512,509

(22) Filed: Aug. 30, 2006

(65) Prior Publication Data

US 2006/0291039 A1 Dec. 28, 2006

Related U.S. Application Data

(63) Continuation of application No. PCT/JP2005/007995, filed on Apr. 27, 2005.

(30) Foreign Application Priority Data

| | | | |
|---|---|---|---|
| Apr. 28, 2004 | (JP) | | 2004-132994 |
| Apr. 28, 2004 | (JP) | | 2004-132996 |

(51) Int. Cl.
*G02B 7/04* (2006.01)
*B23K 26/00* (2006.01)

(52) U.S. Cl. .............. 250/201.2; 250/216; 219/121.6; 219/121.62; 219/121.83

(58) Field of Classification Search ............... 250/216, 250/201.2, 201.3, 201.4, 201.9; 219/121.6, 219/121.61, 121.62, 121.67, 121.83; 359/196, 359/197
See application file for complete search history.

(56) References Cited

U.S. PATENT DOCUMENTS

| | | |
|---|---|---|
| 3,689,159 A | 9/1972 | Taniguchi et al. |
| 5,667,707 A | 9/1997 | Klingel et al. |
| 5,760,901 A | 6/1998 | Hill |
| 6,087,617 A | 7/2000 | Troitski et al. |
| 2002/0109923 A1 | 8/2002 | Matsui et al. |
| 2006/0228095 A1* | 10/2006 | Eda et al. ................. 385/147 |

FOREIGN PATENT DOCUMENTS

| | | |
|---|---|---|
| EP | 0 680 805 A2 | 11/1995 |
| EP | 0 859 259 A2 | 8/1998 |
| FR | 2 096 880 | 3/1972 |
| JP | 58-57108 | 4/1983 |
| JP | 04-327394 | 11/1992 |
| JP | 5-134186 | 5/1993 |
| JP | H05-119263 | 5/1993 |
| JP | 9-230245 | 9/1997 |
| JP | 2000-71088 | 3/2000 |
| JP | 2001-51200 | 2/2001 |
| JP | 2001-83428 | 3/2001 |

(Continued)

*Primary Examiner*—Kevin Pyo
(74) *Attorney, Agent, or Firm*—Scully, Scott, Murphy & Presser, P.C.

(57) ABSTRACT

A laser condensing optical system of the present invention includes a laser beam source which emits a laser beam, a condensing optical system arranged between the laser beam source and a medium, the condensing optical system condensing the laser beam in the medium and recondensing light from a condensing point, a photodetector which detects the light recondensed by the condensing optical system, and a laser divergence point moving unit which moves the position of a laser divergence point of the laser beam along an optical axis of the laser beam in accordance with the refractive index of the medium in which the laser beam is condensed and the distance from a surface of the medium to a condensing position.

21 Claims, 29 Drawing Sheets

FOREIGN PATENT DOCUMENTS

| | | |
|---|---|---|
| JP | 2001-513191 | 8/2001 |
| JP | 2002-303800 | 10/2002 |
| JP | 2003-48091 | 2/2003 |
| JP | 2003-175497 | 6/2003 |
| JP | 2003-195182 | 7/2003 |

* cited by examiner

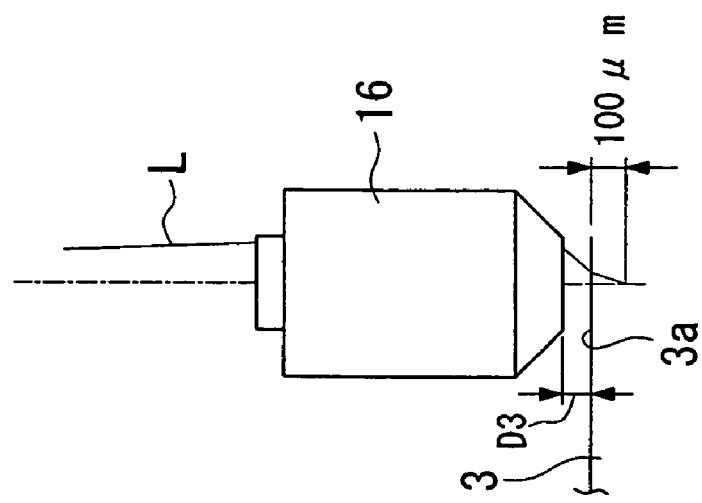
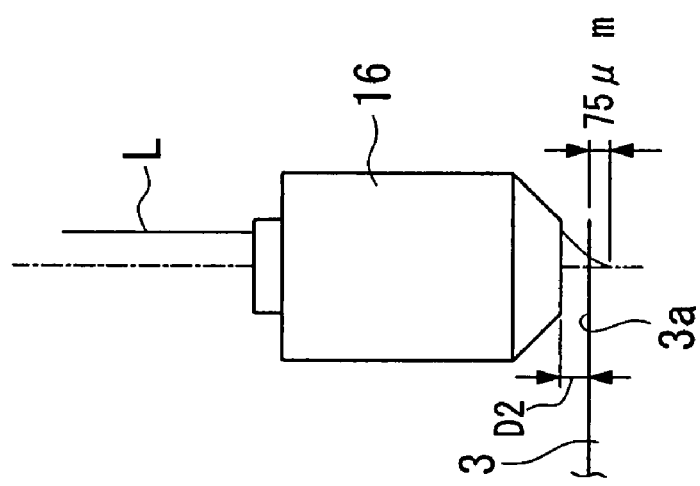
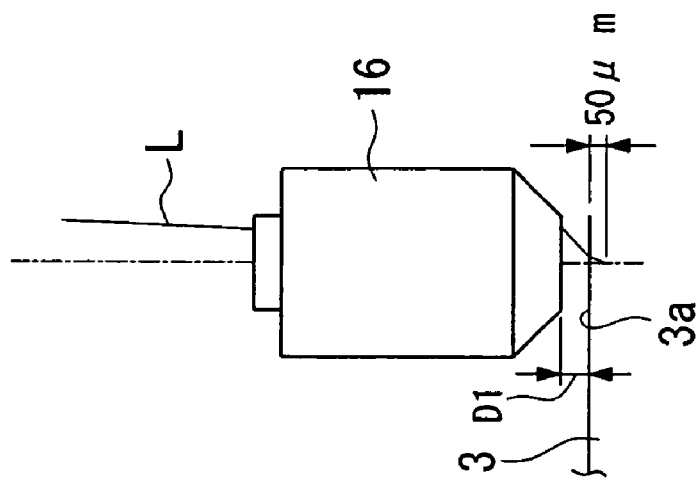

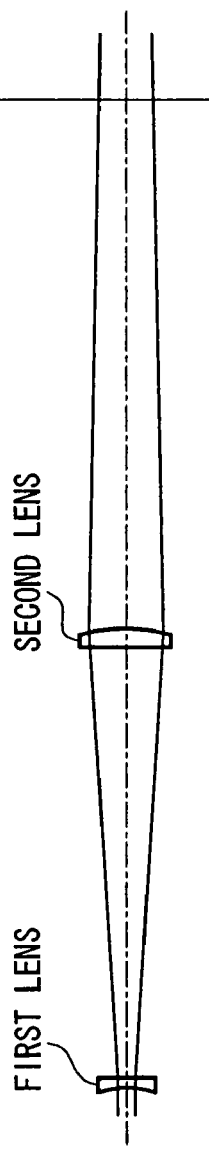
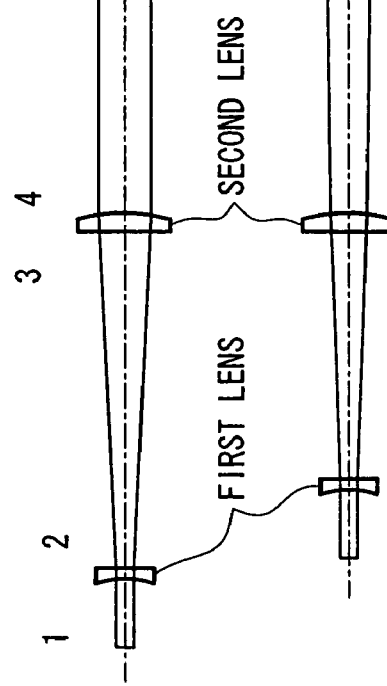
FIG. 15A
FIG. 15B
FIG. 15C

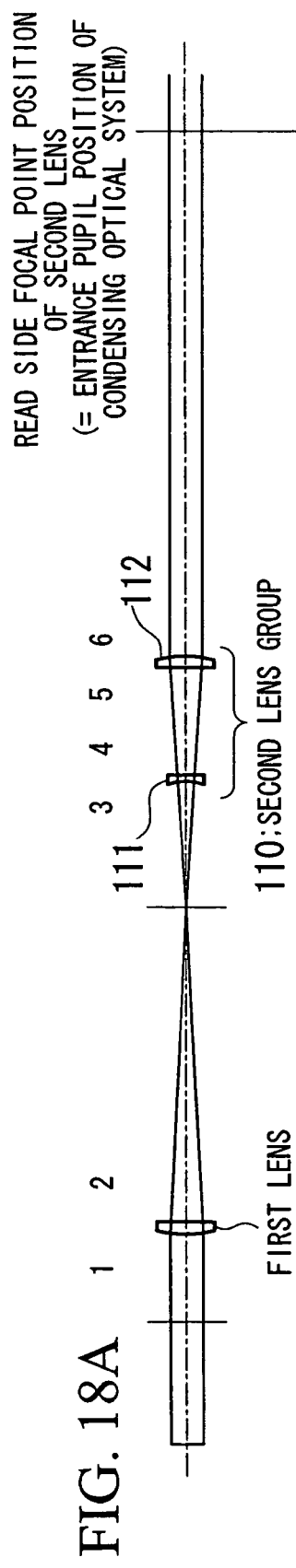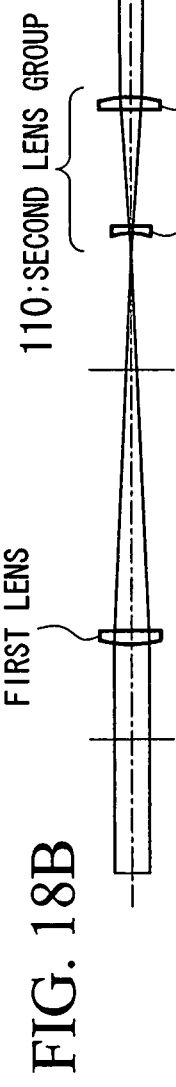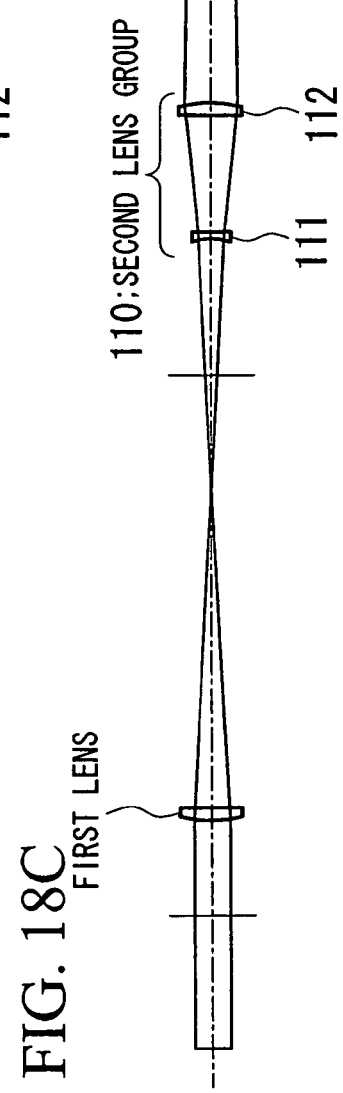

LASER CONDENSING OPTICAL SYSTEM

CROSS REFERENCE TO RELATED APPLICATIONS

This application is a Continuation application of International Patent Application No. PCT/JP2005/007995, filed on Apr. 27, 2005, which claims priority from Japanese Patent Application Nos. 2004-132996 and 2004-132994, the contents of which are incorporated herein.

BACKGROUND OF THE INVENTION

1. Field of the Invention

The present invention relates to a laser condensing optical system which condenses laser light in different sections of a medium.

This invention also relates to an optical system in which the position of a light source can be changed while ensuring that the intensity and the intensity distribution of light which is incident on a pupil face of the optical system remain constant. This invention particularly relates to an optical system which is ideal for condensing light in sections of a medium with different depths, or an optical system which is suitable for changing the condensing position.

2. Description of the Related Art

Conventionally, although there are demands to condense light in sections of different depths in a medium, spherical aberration tends to be generated in such cases. For example, in the field of biology, microscopic samples are generally prepared using glass-covered samples, in which a specimen is placed on a glass slide and sealed with a glass cover; spherical aberration is generated when specimens with glass covers of different thicknesses are observed through a microscope. Glass for LCD has different thicknesses, and spherical aberration may be generated when observing via a substrate. When the amount of spherical aberration varies between different thicknesses (depths), there is a problem of change (degradation) in the condensing performance.

Accordingly, various conventional techniques are used to condense light in sections of different thicknesses such as those mentioned above while correcting spherical aberration and suppressing change in the condensing performance.

For example, in one such technique, parallel plate glasses of different thicknesses are removably attached at the tip of a condensing optical system such as an objective lens.

There is also a conventional objective lens with a correction ring for microscope which successfully corrects aberration over an ultra-wide field, having a magnification of approximately 40-power and an NA (numerical aperture) of 0.93 (e.g. see Japanese Unexamined Patent Application, First Publication No. H05-119263 (FIG. 1 etc.)).

There is also an optical system which corrects spherical aberration by moving a spherical aberration correcting optical system of a combination focal length no power lens in the optical axis direction (e.g. see Japanese Unexamined Patent Application, First Publication No. 2003-175497 (FIG. 1 etc.)).

Furthermore, FIG. 32 shows a microscope device in which spherical aberration is corrected by arranging a spherical aberration correcting lens 252 between an objective lens 250 and a light source 251, and moving the spherical aberration correcting lens 252 along the optical axis (e.g. see Japanese Unexamined Patent Application, First Publication No. 2001-83428 (FIG. 1 etc.)).

SUMMARY OF THE INVENTION

A laser condensing optical system of this invention includes a laser beam source which emits a laser beam; a condensing optical system arranged between the laser beam source and a medium, the condensing optical system condensing the laser beam in the medium and recondensing light from a condensing point; and a laser divergence point moving unit which moves the position of a laser divergence point of the laser beam along an optical axis of the laser beam in accordance with the refractive index of the medium in which the laser beam is condensed and the distance from a surface of the medium to a condensing position.

It is acceptable to provide a scanning unit which can scan the laser beam toward a direction orthogonal to the optical axis of the condensing optical system.

The laser divergence point moving unit may set the position of the laser divergence point based on wavefront data of the condensing optical system measured beforehand.

An observation optical system may be provided in coordination with the condensing optical system, and maintains a predetermined distance from a bottom face of the condensing optical system to the surface of the medium. The observation optical system may include an autofocus detecting unit or an autofocus mechanism.

The relative distance in the optical axis direction between the condensing optical system and the surface of the medium may be constant.

An optical system according to a first aspect of this invention includes an emitting unit which emits a beam of light rays in a parallel state; a condensing optical system which condenses the beam; a first lens group which is arranged in the beam between the emitting unit and the condensing optical system and can move along the optical axis direction of the beam, the first lens group including one or more lenses; a second lens group which is securely arranged in the beam between the first lens group and the condensing optical system, and includes one or more lenses; and a moving unit which moves the first lens group in accordance with the distance to a position where the beam is condensed. A rear side focal length of the second lens group is arranged at least in the vicinity of an entrance pupil position of the condensing optical system.

The condensing optical system may condense the beam in a medium, and the moving unit may move the first lens group in accordance with the refractive index of the medium where the beam is condensed and the distance from a surface of the medium to the condensing position.

The emitting unit may include a laser beam source which emits a laser beam.

An optical tweezers optical system including the optical system may be used.

When |f1| is the combined focal distance of the first lens group and the second lens group, the moving unit may move the first lens group to a position which satisfies the following equation.

$$1/|f1|<0.01$$

When f2 is the focal distance of the second lens group, the second lens group may satisfy the following equation.

$$f2>0$$

When f1 is the focal distance of the first lens group and f2 is the focal distance of the second lens group, the first lens group and the second lens group may satisfy the following equations.

$$f1 < 0$$

and $1 \leq |f2/f1| \leq 5$

When f1 is the focal distance of the first lens group and f2 is the focal distance of the second lens group, the first lens group and the second lens group may satisfy the following equations.

$$f1 > 0$$

and $0.5 \leq |f1/f2| \leq 2$

An optical system according to a second aspect of this invention includes a laser beam source which emits a laser beam; a collimating unit which collimates rays of the laser beam emitted from the laser beam source to collimated (parallel) rays; a condensing optical system which condenses the collimated laser beam in a medium and recondenses light from a condensing point; a scanning unit which can scan a focal point in the medium in a direction perpendicular to the optical axis direction of the laser beam; a photodetector which is arranged at a position conjugate with the laser beam source and detects the beam recondensed by the condensing optical system; a first lens group which is arranged in the beam between the emitting unit and the condensing optical system and can move along the optical axis direction of the beam, the first lens group including one or more lenses; and a moving unit which moves the first lens group in accordance with the refractive index of the medium in which the laser beam is condensed, and the distance from the surface of the medium to a position where the beam is condensed. A rear side focal length of the second lens group is arranged at least in the vicinity of an entrance pupil position of the condensing optical system.

The scanning unit may be a galvanometer mirror.

An optical system according to a third aspect of this invention includes a laser beam source which emits a laser beam; a collimating unit which collimates rays of the laser beam emitted from the laser beam source to parallel rays; a condensing optical system which condenses the collimated laser beam in a medium and recondenses light from a condensing point; a photodetector which is arranged at a position conjugate with the laser beam source and detects the beam recondensed by the condensing optical system; a first lens group which is arranged in the beam between the emitting unit and the condensing optical system and can move along the optical axis direction of the beam, the first lens group including one or more lenses; a second lens group which is securely arranged in the beam between the first lens group and the condensing optical system, and includes one or more lenses; and a moving unit which moves the first lens group in accordance with the refractive index of the medium in which the laser beam is condensed, and the distance from the surface of the medium to a position where the beam is condensed. A rear side focal length of the second lens group is arranged at least in the vicinity of an entrance pupil position of the condensing optical system.

The first lens group and the second lens group may be configured such that they can be inserted/removed from the optical path.

The relative distance in the optical axis direction between the condensing optical system and the surface of the medium may be constant.

An aberration-correcting optical system according to a first aspect of this invention condenses a beam of rays from a beam source, and includes a plurality of lenses which can be exclusively inserted/removed to/from an optical path and satisfy the following equation.

$$2(d^{2}+l \times f - l \times d)NA = f \times a$$

where d is the distance from an entrance pupil position of a condensing optical system to the plurality of lenses, l is the distance from the entrance pupil position of the condensing optical system to the beam source position, f is the focal length of the plurality of lenses, NA is the numerical aperture of the beam source (the numerical aperture seen from a condensing lens), and a is the entrance pupil diameter of the condensing optical system.

A laser scanning optical system according to a first aspect of this invention includes a plurality of lenses which can be inserted/removed to/from an optical path of a converging/diverging optical system and satisfy the following equation.

$$2(d^{2}+l \times f - l \times d)NA = f \times a$$

where d is the distance from an entrance pupil position of a condensing optical system to the plurality of lenses, l is the distance from the entrance pupil position of the condensing optical system to the beam source position, f is the focal length of the plurality of lenses, NA is the numerical aperture of the beam source (the numerical aperture seen from a condensing lens), and a is the entrance pupil diameter of the condensing optical system.

A laser scanning microscope of this invention may include the laser scanning optical system described above.

An optical tweezers according to a first aspect of this invention includes a plurality of lenses which can be inserted/removed to/from an optical path of a converging/diverging optical system and satisfy the following equation.

$$2(d^{2}+l \times f - l \times d)NA = f \times a$$

where d is the distance from an entrance pupil position of a condensing optical system to the plurality of lenses, l is the distance from the entrance pupil position of the condensing optical system to the beam source position, f is the focal length of the plurality of lenses, NA is the numerical aperture of the beam source (the numerical aperture seen from a condensing lens), and a is the entrance pupil diameter of the condensing optical system.

An aberration-correcting optical system according to a second aspect of this invention includes a condensing optical system including a beam source which emits a beam of collimated rays and an optical system which condenses the collimated rays. The aberration-correcting optical system includes a plurality of lenses which can be exclusively inserted/removed to/from an optical path and satisfy the following equation.

$$b(f-d)/f = a$$

where b is the diameter of the collimated beam from the beam source, d is the distance from an entrance pupil position of a condensing optical system to the plurality of lenses, f is the focal length of the plurality of lenses, and a is the entrance pupil diameter of the condensing optical system.

A laser scanning optical system according to a second aspect of this invention includes a plurality of lenses which can be exclusively inserted/removed to/from an optical path of a beam of collimated rays and satisfy the following equation.

$$b(f-d)/f=a$$

where b is the diameter of the collimated beam from the beam source, d is the distance from an entrance pupil position of a condensing optical system to the plurality of lenses, f is the focal length of the plurality of lenses, and a is the entrance pupil diameter of the condensing optical system.

An optical tweezers according to this invention includes a plurality of lenses which can be exclusively inserted/removed to/from an optical path of a beam of collimated rays and satisfy the following equation.

$$b(f-d)/f=a$$

where b is the diameter of the collimated beam from the beam source, d is the distance from an entrance pupil position of a condensing optical system to the plurality of lenses, f is the focal length of the plurality of lenses, and a is the entrance pupil diameter of the condensing optical system.

BRIEF DESCRIPTION OF THE DRAWINGS

FIGS. 10A to 10C diagrams of states when a laser beam is irradiated to positions at different depths from a sample surface based on the flowchart of FIG. 9, FIG. 3A being a position at 50 µm from the sample surface, FIG. 3B being a position at 75 µm, and FIG. 3C being a position at 100 µm.

FIGS. 15A to 15C are diagrams of a specific configuration of a first lens and a second lens described in the optical system according to the fifth embodiment of this invention.

FIGS. 18A to 18C are diagrams of a specific configuration of a first lens and a second lens described in the optical system according to the seventh embodiment of this invention.

DETAILED DESCRIPTION OF THE INVENTION

A laser condensing optical system according to a first embodiment of this invention will be explained with reference to FIGS. 1 to 3.

Figure 1:
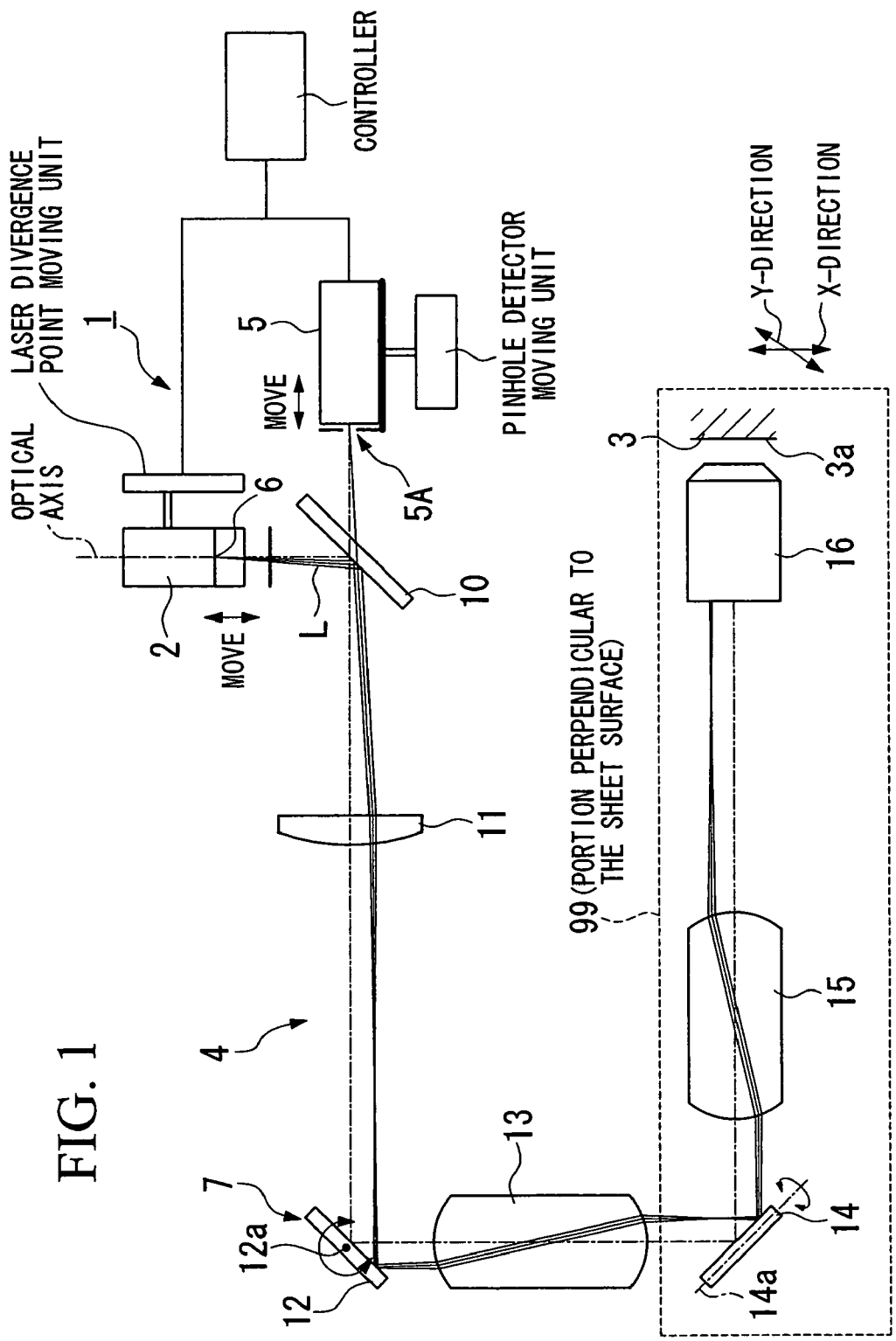
FIG. 1 is a diagram of a configuration of a laser condensing optical system according to a first embodiment of this invention.

In FIG. 1, a laser condensing optical system 1 of this embodiment includes a laser beam source 2 which emits a laser beam L in a divergent state (in the state of non-parallel rays), a condensing optical system 4 which is disposed between the laser beam source 2 and a sample (medium) 3, the condensing optical system 4 condensing the laser beam L onto the sample and recondensing light from a condensing point, a photodetector 5 (pinhole detector) which is arranged in a position conjugate with the laser beam source 2 and detects light which is recondensed by the condensing optical system 4 via a pinhole 5A, a laser divergence point moving unit which can move the position of a laser divergence point 6 of the laser beam L, i.e. the position of the laser beam source 2, along the optical axis of the laser beam L in accordance with the refractive index of the sample 3 where the laser beam L is condensed and the distance from a sample face (the surface of the sample) to the condensing position, a pinhole detector moving unit for moving the pinhole 5A and the photodetector 5 to a position conjugate with the moved laser divergence point 6, and a scanning unit 7 which can scan the laser beam L in a direction orthogonal to the optical axis of the condensing optical system 4 (horizontal direction, XY direction).

The sample 3 is mounted on an unillustrated stage which can be moved in the XY direction. Moreover, FIG. 1 shows the overall configuration of the optical system in a plan view; however, a portion denoted by the reference numeral 99 is arranged so as to be perpendicular to the sheet surface of FIG. 1.

The laser divergence point moving unit is connected to a controller, and enables the laser divergence point 6 to be moved by moving the laser divergence point 6 after receiving a signal from the controller. The pinhole detector moving unit is connected to the controller, and is moved to a position conjugate with the laser divergence point 6 in accordance with a signal from the controller. The controller includes an input unit which can input predetermined information, and a calculator which calculates the amount of movement of the laser beam source 2 based on various information (input data) which is input to the input unit. In accordance with the calculated result, the controller sends a signal to the laser divergence point moving unit and moves it.

In addition to controlling the laser divergence point moving unit, the controller simultaneously controls the laser beam source 2 such that it emits the laser beam L after the laser divergence point 6 moves.

The condensing optical system 4 includes a half mirror 10 which reflects the laser beam L emitted from the laser beam source 2 by changing the direction of the optical axis by 90 degrees, an imaging lens 11 which alters the laser beam L reflected from the half mirror 10 to substantially collimated light, a first galvanometer mirror 12 which reflects the laser beam L at different angles such that it can be scanned in one direction (X direction) which is horizontal to the sample face 3a, a first pupil relay optical system 13 which relays the laser beam L reflected by the first galvanometer mirror 12, a second galvanometer mirror 14 which reflects the laser beam L which passes the first mirror relay optical system 13 at different angles such that it can be scanned in another direction (Y direction) which is horizontal to the sample face 3a, a second pupil relay optical system 15 which relays the laser beam L reflected by the second galvanometer mirror 14, and an objective lens 16 which condenses the laser beam L which passes the second pupil relay optical system 15 onto the sample and recondenses light from the condensing point.

The first galvanometer mirror 12 and the second galvanometer mirror 14 respectively have, at their central positions, rotation axes 12a and 14a which are arranged facing in mutually orthogonal directions, and vibrate around these rotation axes 12a and 14a within predetermined angles. This vibration enables the laser beam L to be reflected at different angles as mentioned above. By combining both galvanometer mirrors 12 and 14, the laser beam L can be scanned in a direction orthogonal to the optical axis direction of the condensing optical system 4 (XY direction). That is, the galvanometer mirrors 12 and 14 function as the scanning unit 7. The vibration (operation) of the galvanometer mirrors 12 and 14 is controlled by the controller.

The pinhole 5A and the photodetector 5 are arranged on the rear side of the half mirror 10, and the controller controls the pinhole detector moving unit to move them in the optical axis direction in synchronism with the movement of the laser beam source 2.

An example of observing positions at different depths from the sample face 3a using the laser condensing optical system 1 with this configuration will be explained. In this example, positions at depths of 50 μm, 75 μm, and 100 μm from the sample face 3a are observed.

Figure 2:
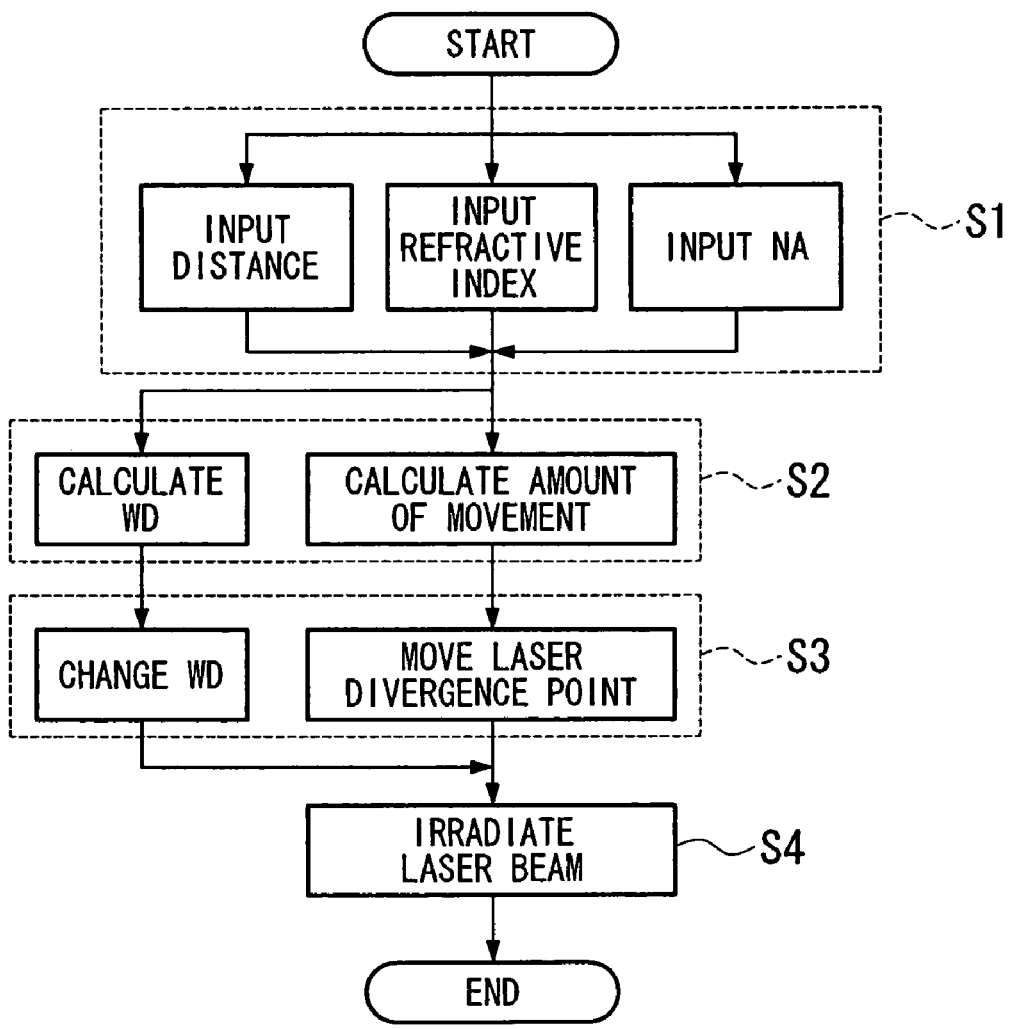
FIG. 2 is an example of a flowchart when the same laser condensing optical system is used in irradiating a laser beam to positions at different depths from a sample surface and observing them.

In FIG. 2, to observe a position at a depth of 50 μm from the sample face 3a, the refractive index of the sample 3, the distance from the sample face 3a to the condensing position (i.e. 50 μm), and the NA (numerical aperture) of the condensing optical system 4 are input to the input unit of the controller (step S1). Based on this input data, the calculator calculates the amount of movement of the laser divergence point 6, i.e. the amount of movement of the laser beam source 2, and the distance from a bottom face of the objective lens 16 to the sample face 3a, i.e. the WD (step S2). After calculation, based on the calculated results, the controller controls the laser divergence point moving unit so as to move the laser beam L in the optical axis direction, moving the position of the laser beam source 2 to a predetermined position and changing the distance from the objective lens 16 to the sample face 3a (the WD) (step S3).

Figure 3A:
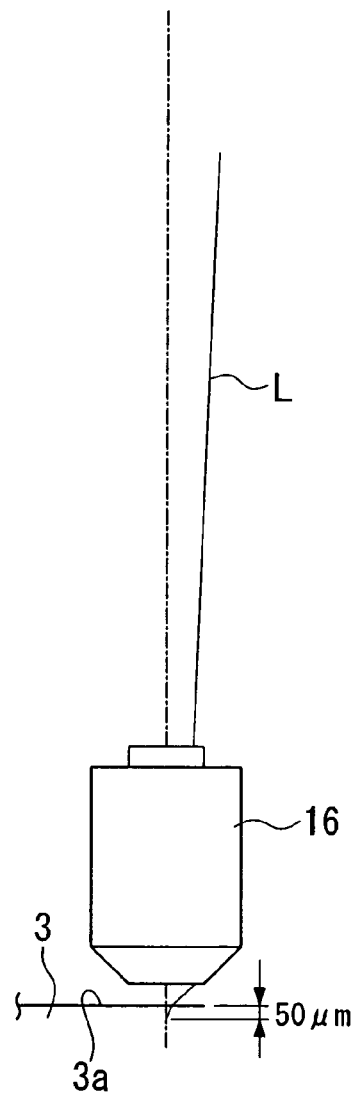
FIGS. 3A to 3C show diagrams of states where the same laser condensing optical system is used in irradiating a laser beam to positions at different depths from a sample surface, FIG. 3A being a position at 50 µm from the sample surface, FIG. 3B being a position at 75 µm, and FIG. 3C being a position at 100 µm.

After moving the laser beam source 2 and changing the WD, the controller sends a signal to the laser beam source 2 and makes it emit the laser beam L (step S4). The emitted laser beam L is reflected by the half mirror 10 and substantially collimated by the imaging lens 11 before being incident on the first galvanometer mirror 12. The first galvanometer mirror 12 reflects the laser beam L toward the X direction of the sample face 3a at different angles. The reflected laser beam L passes the first pupil relay optical system 13 and is reflected by the second galvanometer mirror 14 toward the Y direction of the sample face 3a at different angles. The reflected laser beam L is incident on the objective lens 16 via the second pupil relay optical system 15. As shown in FIG. 3A, the objective lens 16 condensing the laser beam L at the position 50 μm from the sample face 3a.

As already mentioned, the position of the laser beam source 2 corresponding to a depth of 50 μm, i.e. the position of the laser divergence point 6, is adjusted such that the amount of spherical aberration at a depth of 50 μm can be significantly suppressed and the laser beam L can be efficiently condensed at that position.

Light from the condensing point is recondensed by the objective lens 16, passes along the reverse optical path mentioned above, through the pinhole 5A, and is detected by the photodetector 5. That is, the light recondensed by the objective lens 16 passes the second pupil relay optical system 15, is reflected by the second galvanometer mirror 14, passes the first pupil relay optical system 13, is reflected by the first galvanometer mirror 12, passes the imaging lens 11 and is transmitted through the half mirror 10; after this sequence, it passes the pinhole 5A and is detected by the photodetector 5. The light recondensed by the objective lens 16 is reflected by both galvanometer mirrors so that it follows the same optical path as the laser beam L.

As described above, since the laser beam L is condensed at a condensing point (the position at a depth of 50 µm from the sample face) while significantly suppressing the generation of spherical aberration, the photodetector 5 can obtain an observation image with little error. This makes the observation highly precise. In particular, since the pinhole 5A and the photodetector 5 move in the optical axis direction in synchronism with the laser beam source 2, the confocal effect obtains an observation image having good contrast at the condensing point.

Since the galvanometer mirrors 12 and 14 scan the laser beam L toward the horizontal direction (XY direction) of the sample face 3a, observation becomes possible across the entire visual field. The entire visual field can now be scanned without moving the sample 3 side (stage side).

To observe positions at depths of 75 µm and 100 µm from the sample face 3a, the refractive index of the sample face 3a, the distance from the sample face 3a to the condensing position (70 µm and 100 µm), and the numerical aperture of the condensing optical system 4 are input to the input unit of the controller in the same manner as above. After calculation by the calculator, based on the calculated results, the controller controls the laser divergence point moving unit so as to move the laser beam L in the optical axis direction, moving the position of the laser beam source 2 to a predetermined position. The laser beam L is then emitted, and the condensing optical system 4 condenses the laser beam L at positions of 75 µm and 100 µm from the sample face 3a. In addition, the light from the condensing point is recondensed, and is detected via the pinhole 5A by the photodetector 5.

Figure 3B:
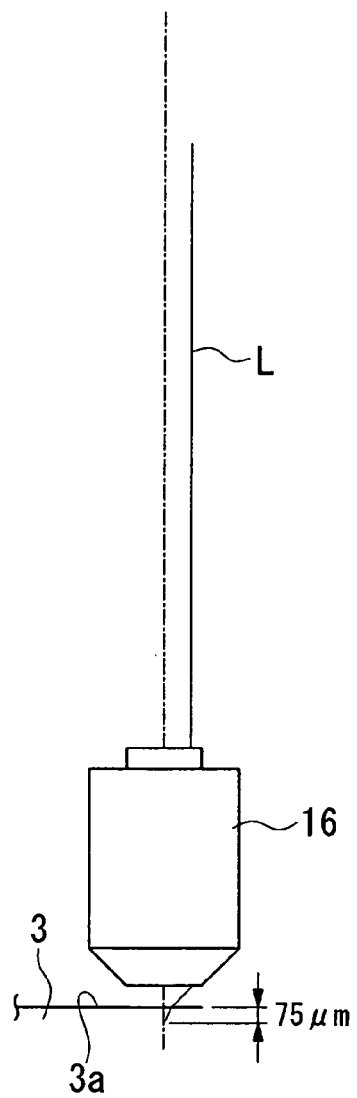
Figure 3C:
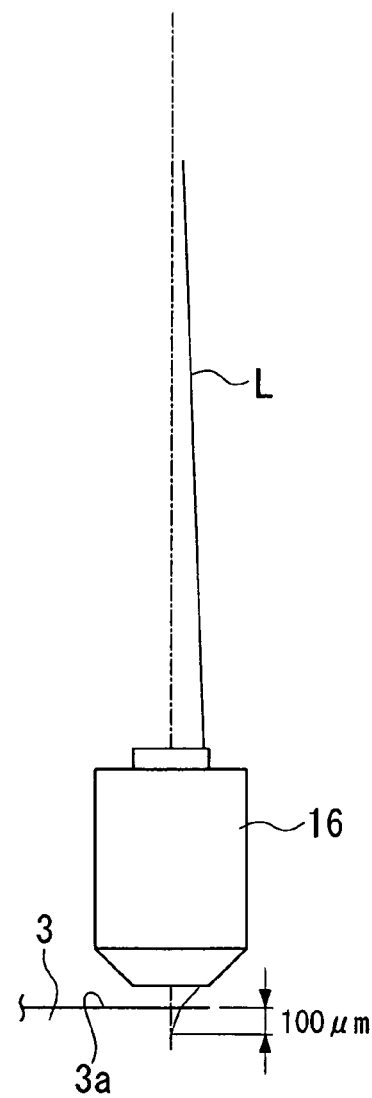

In the same manner as mentioned above, the position of the laser divergence point 6 which corresponds to a depth of 75 µm and 100 µm is adjusted such that the amount of spherical aberration at those depths can be significantly suppressed, and, as shown in FIGS. 3B and 3C, the laser beam L can be efficiently condensed at the positions of 75 µm and 100 µm. Therefore, a highly precise observation image with little error can be obtained.

As described above according to the laser condensing optical system 1 of this embodiment, when condensing laser beam L at different depths from the sample face 3a (50 µm, 75 µm, and 100 µm), the laser divergence point moving unit moves the laser beam source 2, i.e. the laser divergence point 6, along the optical axis in accordance with the refractive index of the sample 3 and the distance from the sample face 3a to the condensing positions, thereby significantly suppressing the amount of spherical aberration and efficiently condensing the laser beam L in an ideal state at each depth. Therefore, even if the depth from the sample face 3a is changed, an observation image with little error can be obtained at each position and the sample 3 can be observed highly precisely. Since the pinhole 5A and the photodetector 5 move in the optical axis direction in synchronism with the movement of the laser beam source 2, the confocal effect obtains an observation image having good contrast.

Since the configuration moves only the laser beam source 2, spherical aberration can be corrected easily without consuming time in the conventional manner. Since a special optical system such as an objective lens with a correction ring is not required, the configuration can be simplified while reducing the cost. Moreover, since the laser beam source 2 only need be moved, continuous variability is easy and the configuration is easily adapted for automation.

While in the first embodiment, the refractive index of the sample 3, the distance from the sample face 3a to the condensing position, and the NA of the condensing optical system are input to the input unit in order to calculate the position of the laser beam source 2, this invention is not limited to this. For example, in addition to these input data, it would be acceptable to input wavefront data measured from the condensing optical system 4 beforehand and calculate the position of the laser beam source 2 accordingly.

Figure 4:
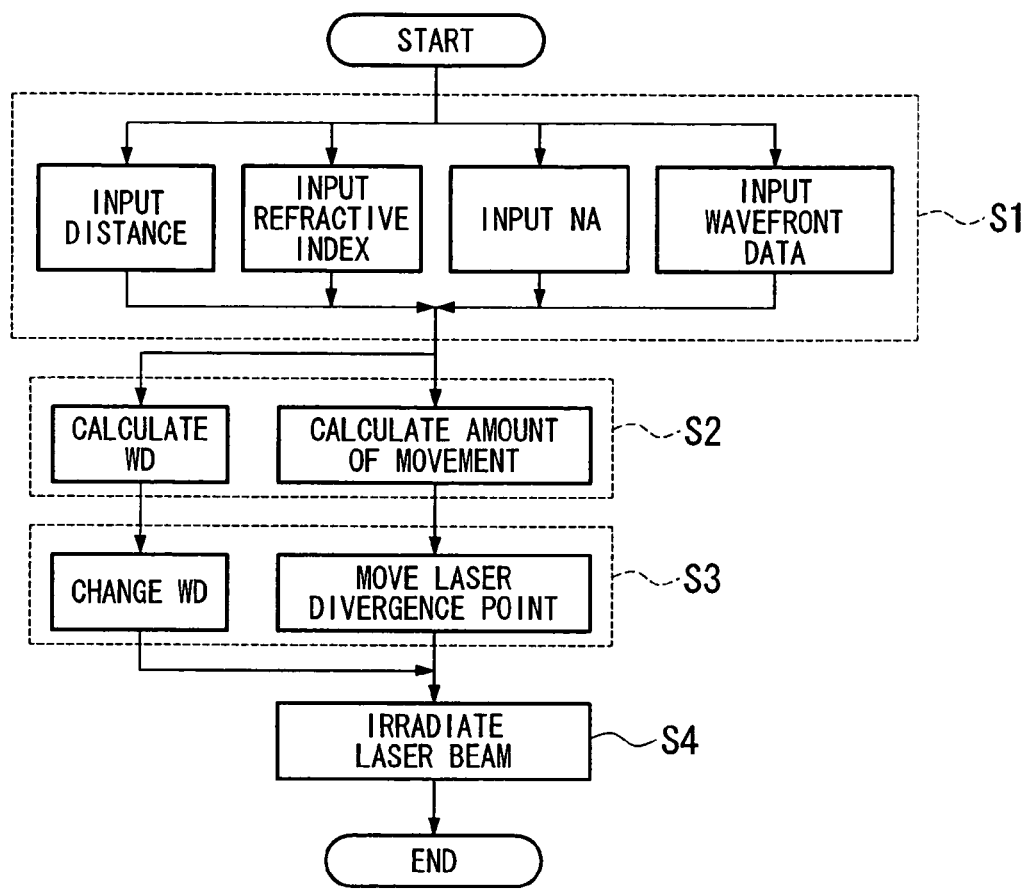
FIG. 4 is an example of a flowchart when the same laser condensing optical system is used in irradiating a laser beam after considering wavefront data of a condensing optical system.

As shown in FIG. 4, when inputting the various data to the input unit (step S1 above), the refractive index of the sample 3, the distance from the sample face 3a to the condensing position, the NA of the condensing optical system 4, and wavefront data of the condensing optical system 4, are input.

This enables spherical aberration to be corrected with high precision, increases the condensing performance of the laser beam L, and obtains an observation image with even less error.

Wavefront data of the condensing optical system 4 may consist of wavefront data of the objective lens 16 which forms part of the condensing optical system 4 or wavefront data of the entire condensing optical system 4.

While in the first embodiment, the pinhole 5A and the photodetector 5 can be moved by the pinhole detector moving unit, it would be acceptable to move only the pinhole 5A to a position conjugate with the laser divergence point 6.

Figure 5:
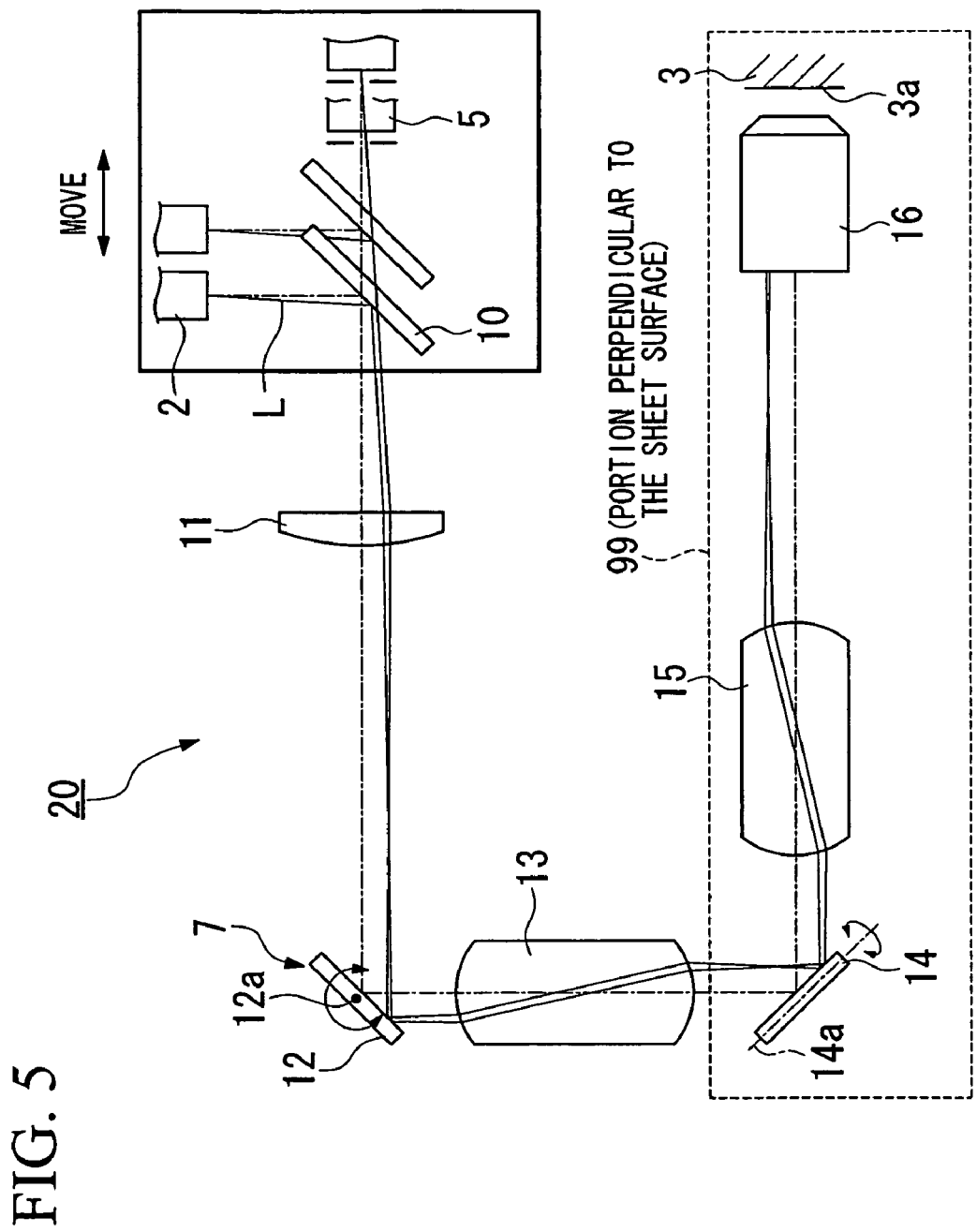
FIG. 5 is a diagram of a configuration of a laser condensing optical system according to a second embodiment of this invention.

Subsequently, a laser condensing optical system according to a second embodiment of this invention will be explained with reference to FIG. 5. In the second embodiment, constituent elements which are the same as those in the first embodiment are represented by the same reference codes and are not repetitiously explained. In FIG. 5, the pinhole detector moving unit, the laser divergence point moving unit, and the controller of FIG. 1 are omitted for reasons of clarity.

The second embodiment differs from the first embodiment in that, while in the first embodiment, the laser divergence point moving unit moves the laser beam source 2 so as to adjust the position of the laser divergence point 6, in a laser condensing optical system 20 of the second embodiment, the laser divergence point moving unit moves the laser beam source 2, the half mirror 10, the pinhole 5A, and the photodetector 5 in an unified operation so as to adjust the position of the laser divergence point 6.

This configuration enables the laser divergence point to be moved easily without needing to synchronize the pinhole 5A and the photodetector 5 with the movement of the laser beam source 2. Therefore, the configuration can be simplified while reducing costs.

Figure 6:
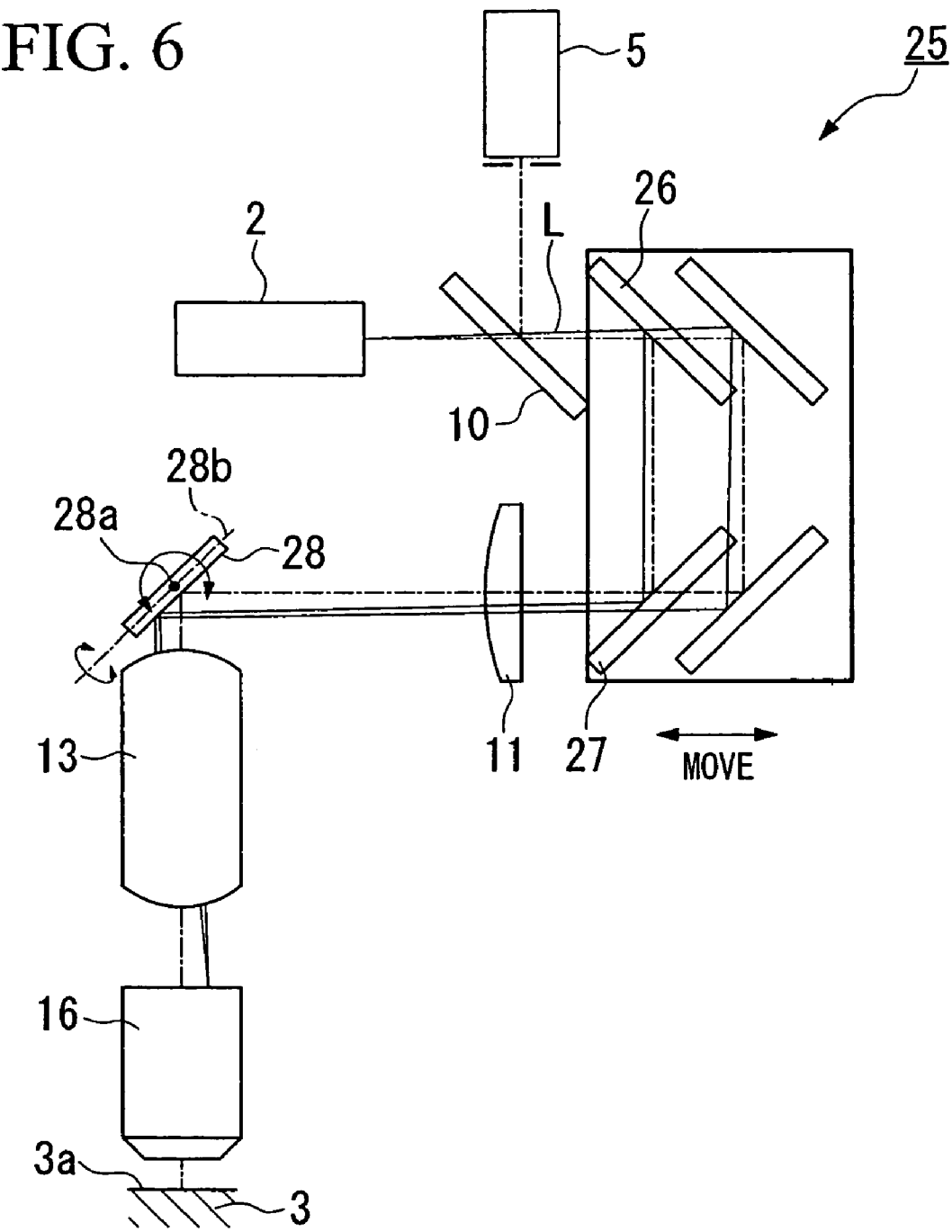
FIG. 6 is a diagram of a configuration of another example of a laser condensing optical system according to this invention.

The method for moving the laser divergence point is not limited to those described in the first embodiment and the second embodiment. For example, the laser divergence point may be moved in the manner of a laser condensing optical system 25 shown in FIG. 6 (in FIG. 6, the laser divergence point moving unit and the controller are omitted for reasons of clarity). A first mirror 26 and a second mirror 27 are arranged between the half mirror 10 and the imaging lens 11, and each reflects the laser beam L transmitted through the half mirror 10 such that its optical axis changes by 90 degrees. The emission direction of the laser beam L is thereby changed by 180 degrees due to these mirrors 26 and 27, and in addition, the laser divergence point moving unit moves the mirrors 26 and 27 together in the optical axis direction of the laser beam L. Trapezoidal prisms with opposing reflecting faces can be used instead of the mirrors 26 and 27.

With this configuration, the laser divergence point 6 can be easily moved without changing the positions of the laser beam source 2, the pinhole 5A, and the photodetector 5, and the configuration can be further simplified.

The laser condensing optical system 25 includes a two-dimensional galvanometer mirror 28. The two-dimensional galvanometer mirror 28 has two rotation axes 28a and 28b which face in the same directions as the rotation axes 12a and 14a of the first galvanometer mirror 12 and the second galvanometer mirror 14 of the first embodiment, and vibrates two-dimensionally around these rotation axes 28a and 28b at predetermined angles. That is, the two-dimensional galvanometer mirror 28 functions as a scanning unit.

Since it is not necessary to provide two galvanometer mirrors and two pupil relay optical systems as in the first embodiment, the configuration can be further simplified and the cost can be reduced.

Subsequently, a laser condensing optical system according to a third embodiment of this invention will be explained with reference to FIGS. 7 and 8. In the third embodiment, constituent elements which are the same as those in the second embodiment are represented by the same reference codes and are not repetitiously explained.

The third embodiment differs from the second embodiment in that while in the second embodiment, scanning is performed regardless of the distance between the objective lens 16 and the sample face 3a, in the third embodiment, a constant distance is maintained between them when scanning.

Figure 7:
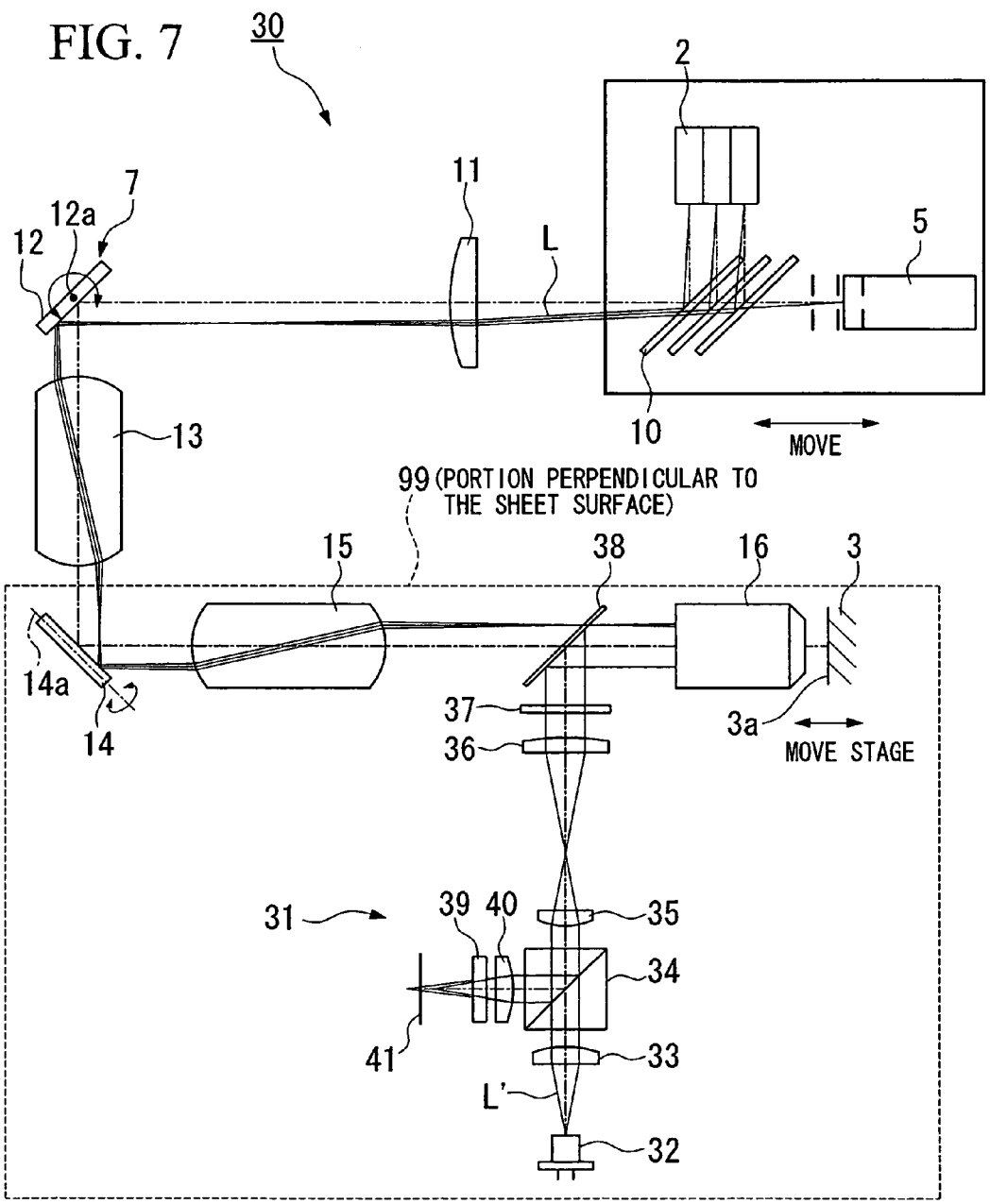
FIG. 7 is a diagram of a configuration of a laser condensing optical system according to a third embodiment of this invention.
Figure 8:
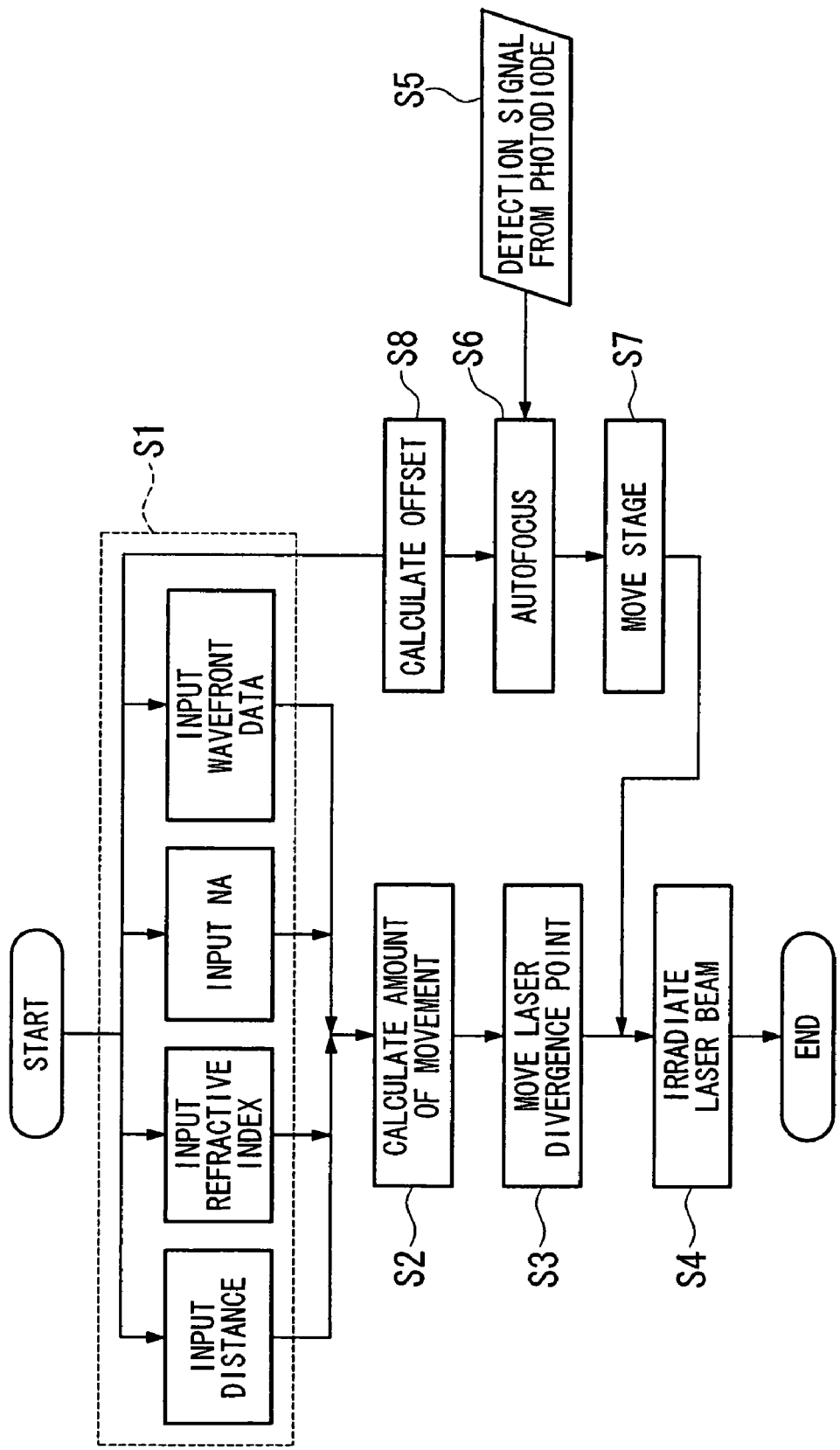
FIG. 8 is an example of a flowchart when the same laser condensing optical system is used in irradiating a laser beam to positions at different depths from a sample surface.

As shown in FIG. 7, a laser condensing optical system 30 of this embodiment is provided in coordination with the condensing optical system 4, and includes an observation optical system 31 which maintains a constant distance from the condensing optical system 4, i.e. the bottom face of the objective lens 16, to the sample face 3a. The observation optical system 31 includes an autofocus mechanism.

The observation optical system 31 includes a light source 32 which emits a linearly polarized semiconductor laser beam L', a first lens 33 which collimates the semiconductor laser beam L' emitted from the light source 32, a polarizing beam splitter 34 arranged adjacent to the first lens 33, a second lens 35 which converges and disperses the semiconductor laser beam L' transmitted through the polarizing beam splitter 34, a third lens 36 which collimates the semiconductor laser beam L' dispersed by the second lens 35 to a collimated beam the size of the pupil diameter of the objective lens 16, a quarter wavelength plate 37 which converts the polarized light of the semiconductor laser beam L' transmitted through the third lens 36 to circularly polarized light, a dichroic mirror 38 which reflects the semiconductor laser beam L' transmitted through the quarter wavelength plate 37 such that the direction of the optical axis is changed by 90 degrees and the light is made incident upon the objective lens 16, a fourth lens 40 which makes light returning from the objective lens 16 after being again transmitted through the quarter wavelength plate 37 and reflected by the polarizing beam splitter 34 incident on a cylindrical lens 39, and a photodiode 41 which is provided behind the cylindrical lens 39.

The dichroic mirror 38 is set so as to reflect the semiconductor laser beam L' while transmitted light at other wavelengths, e.g. the laser beam L emitted from the laser beam source 2.

Of the linearly polarized light, for example, the polarizing beam splitter 34 transmits the linearly polarized light of a vibration component P which is parallel to the incidence face, and reflects light of a vibration component S which is perpendicular to the incidence face. The controller controls the stage using feedback based on detection signals receives from the photodiode 41, and moves the stage in a vertical direction (optical axis direction). That is, it functions as an autofocus. Consequently, the semiconductor laser beam L' can be aligned with the focal point on the sample face 3a at all times.

When scanning with the laser condensing optical system 30 of this configuration, the refractive index of the sample 3, the distance from the sample face 3a to the condensing position, and the NA of the laser condensing optical system 30 are input to the input unit of the controller (step S1). Based on this input data, the calculator calculates the amount of movement of the laser divergence point, i.e. it calculates the amount of movement of the laser beam source 2 (step S2) and the offset of the autofocus (step S8).

The light source 32 then emits the linearly polarized semiconductor laser beam L'. The emitted semiconductor laser beam L' is collimated by the first lens 33 and is made incident on the polarizing beam splitter 34. The linearly polarized vibration component P which is parallel to the incidence face is converged by the second lens 35 and dispersed. The dispersed light is collimated again by the third lens 36 and is incident on the quarter wavelength plate 37. At this time, the width of the collimated beam corresponds to the objective lens 16. After being transmitted through the quarter wavelength plate 37, the semiconductor laser beam L' becomes circularly polarized. It is then reflected by the dichroic mirror 38 and is incident on the objective lens 16. The beam incident on the objective lens 16 is illuminated onto the sample face 3a.

The light reflected from the sample face 3a is condensed by the objective lens 16, reflected by the dichroic mirror 38, and is made incident on the quarter wavelength plate 37, thereby becoming the vibration component S which is perpendicular to the incidence face. This light is transmitted through the third lens 36 and the second lens 35, is made incident on the polarizing beam splitter 34 and reflected towards the fourth lens 40. After being converged by the fourth lens 40, it passes the cylindrical lens 39 and forms an image on the photodiode 41. The light which forms the image is photoelectrically converted and sent to the controller as a detection signal (step S5). The controller executes a calculation based on the offset calculated by the calculator and the detection signal (step S6), and moves the stage further in the vertical direction (optical axis direction) (step S7). That is, the distance from the objective lens 16 to the sample face 3a is controlled appropriately so that the laser beam can be condensed at the desired depth by automatic autofocusing.

Consequently, the laser beam can be scanned while maintaining a constant distance between the objective lens 16 and the sample face 3a at all times. Therefore, even if the stage is slightly bent or if there is some error in its movement, the laser beam L can be condensed accurately at the desired depth. This makes it possible to scan while controlling the condensing position from the sample face 3a more accurately, and enables the sample 3 to be observed with greater precision.

In scanning, when changing the condensing position of the laser beam L, the autofocus offset is calculated (step S8) prior to scanning. For example, when scanning by condensing the laser beam L at a depth of 100 μm and then at a depth of 50 μm, the WD must be reset to an optimum value. The autofocus must be offset by a predetermined amount to accompany this change in the WD. In other words, the WD is compensated by calculating the offset of the autofocus. After offsetting, a different depth is scanned in the same manner as described above.

Figure 9:
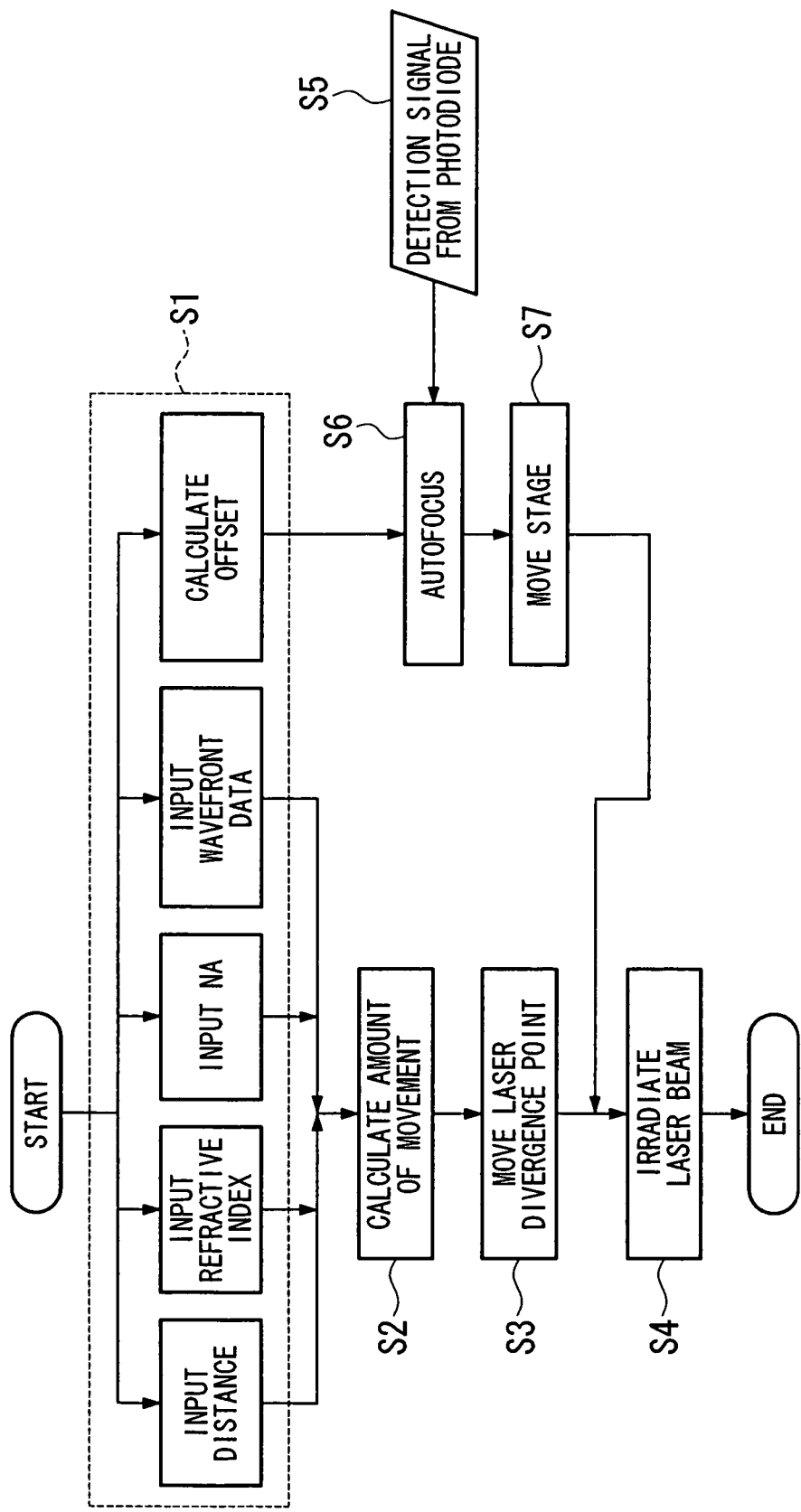
FIG. 9 is a diagram of a laser condensing optical system according to a fourth embodiment of this invention, being an example of a flowchart when irradiating a laser beam to positions at different depths from a sample surface.

Subsequently, a laser condensing optical system according to a fourth embodiment of this invention will be explained with reference to FIGS. 9 and 10. In the fourth embodiment, constituent elements which are the same as those in the third embodiment are represented by the same reference codes and are not repetitiously explained.

The fourth embodiment differs from the third embodiment in that while in the third embodiment, the relative distance in the optical axis direction between the objective lens 16 and the sample face 3a, i.e. the WD, is not constant, in the fourth embodiment the WD is constant.

The positions of the stage and the objective lens 16 in the optical axis direction are set beforehand, and they are kept in the same positions thereafter. As shown in FIG. 9, the WD value is excluded from the various data which are input to the input unit (step S1 above), i.e. the input data includes only the refractive index of the sample 3, the distance from the sample face 3a to the condensing position, and the NA of the condensing optical system 4.

As shown in FIGS. 10A to 10C, while keeping the WD constant, the laser divergence point moving unit moves only the laser divergence point along the optical axis direction, and consequently there is no need to recalculate the offset of the autofocus after initially setting it. Therefore, the time required for offsetting can be shortened, improving the throughput. Degradation in the precision of the autofocus caused by offsetting can also be reduced.

The technical scope of the present invention is not limited to the embodiments described above, and various modifications can be made without departing from the spirit of this invention.

For example, while in each of the embodiments, laser light is condensed in a sample, the configuration is not limited to a sample: light need only be condensed on a medium. The condensing distance from the sample face is not limited to 50 μm, 75 μm, and 100 μm as described in the embodiments, and may be set at will. While the relative distance between the objective lens and the sample face in the optical axis direction is changed by moving the stage, this invention is not limited to this. For example, the relative distance could be changed by using a piezoelectric element or the like to move the objective lens.

While the controller automatically controls the laser divergence point moving unit, the position of the laser divergence point can be changed by moving the laser divergence point moving unit based on a calculation result obtained by the controller.

The observation optical system described in the third embodiment is merely one example, and, provided that the distance from the bottom face of the objective lens to the sample face can be maintained, any combination of optical systems such as lenses is acceptable.

A laser condensing optical system according to a fifth embodiment of this invention will be explained with reference to FIGS. 13 and 14.

Figure 13:
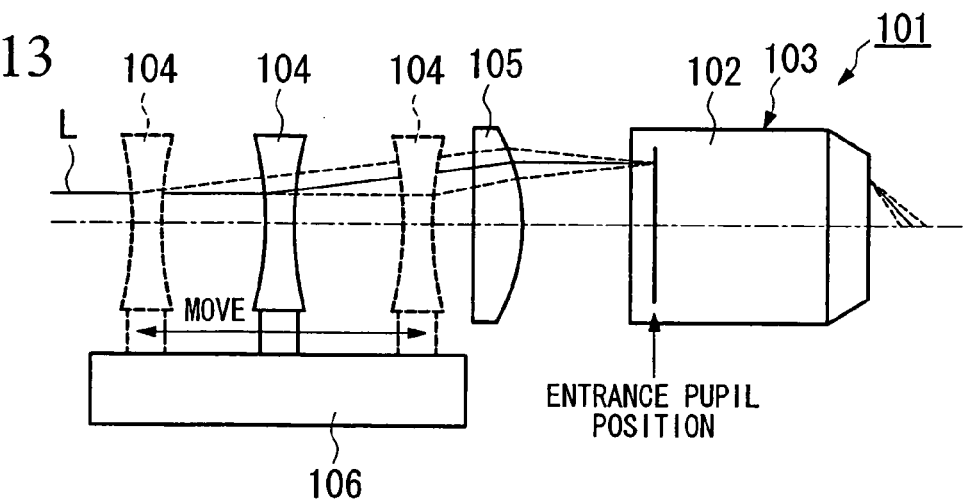
FIG. 13 is a diagram of a configuration of a condensing optical system according to a fifth embodiment of this invention.

As shown in FIG. 13, an optical system 101 of this embodiment includes an unillustrated emitting unit which emits a beam L of collimated rays, a condensing optical system 103 including an objective lens 102 which condenses the beam L, first lenses (first lens group) 104 which are arranged in the beam between the emitting unit and the objective lens 102 and can be moved along the optical axis direction of the beam L, a second lens (second lens group) 105 which are arranged between the first lens group 104 and the objective lens 102 and is secured in the beam, and a moving unit 106 which moves the first lens group 104 in accordance with the distance to the position where the beam L is condensed.

The first lens 104 consists of a double-concave lens secured to an unillustrated lens frame. The moving unit 106 is connected to the lens frame and can move the first lens 104 via the lens frame. The moving unit 106 is also connected to an unillustrated controller, and operates based on signals received from this controller.

The controller includes an input unit which predetermined information can be input to, and a calculator which calculates the amount of movement of the first lens 104 based on input information (input data) input to the input unit, the moving unit 106 being moved by a predetermined amount in accordance with the calculated result. In addition to controlling the moving unit 106, the controller simultaneously controls the emitting unit to emit the beam L after moving the first lens 104.

The second lens 105 is a convex lens, with its flat face side facing the first lens 104 side, that is, its convex face side faces the objective lens 102 lens, and is arranged such that its rear side focal point position is at least in the vicinity of the entrance pupil position of the objective lens 102.

An example of condensing the beam L using the optical system 101 of this configuration will be explained.

Figure 14:
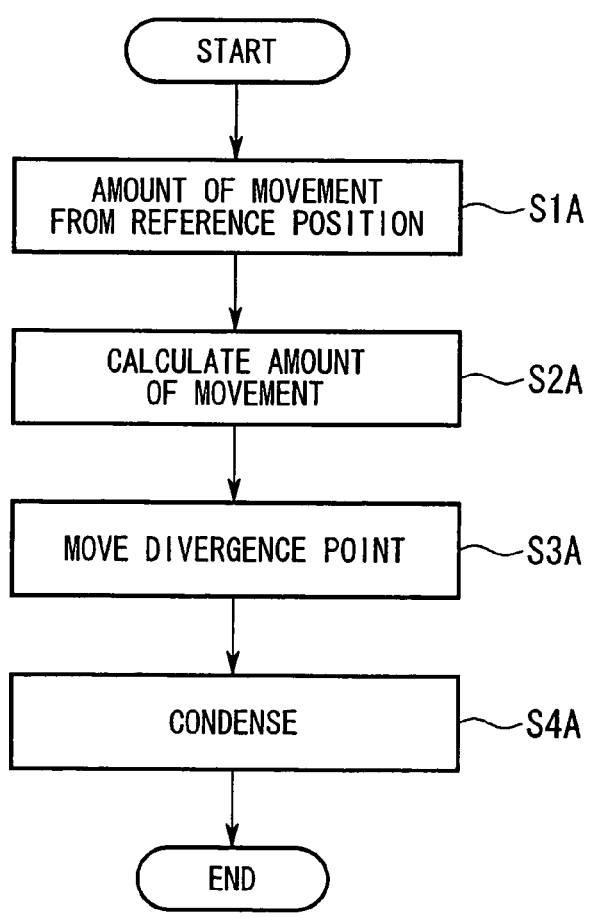
FIG. 14 is an example of a flowchart when using the same optical system in condensing rays at a desired position.

As shown in FIG. 14, an amount of movement from a reference position to a position for condensing the beam L is input to the input unit of the controller (step S1A). Based on this input data, the calculator calculates the amount of movement of the moving unit 106 (step S2A). After this calculation, the controller moves the moving unit 106 in the optical axis direction of the beam L based on the calculated result, whereby the first lens 104 is moved to a predetermined position (step S3A).

After moving the first lens 104, the controller sends a signal to the emitting unit and makes it emit the beam L. The collimated rays of the emitted beam L are refracted by the first lens 104 and become dispersed, and are incident on the second lens 105. That is, the divergence point position of the beam L in the optical axis direction is changed by moving the first lens 104. The dispersed rays of the beam L are refracted again by the second lens 105, become incident on the objective lens 102, and are condensed at the desired position (step S4A).

When condensing the beam L at a position which is different to the abovementioned condensing position, the amount of movement from the reference position to a new condensing point is input to the input in the same manner as described above. Based on the result calculated by the calculator, the controller operates the moving unit 106 and moves the first lens 104 along the optical axis direction. As a consequence, the beam L emitted from the emitting unit is refracted at a position different to the one mentioned above and becomes dispersed before being incident upon the second lens 105. Since the beam L is incident on the first lens 104 in a parallel state, it is always refracted at the same angle irrespective of the position of the first lens 104 before being incident on the second lens 105. Therefore, the beam L is condensed by the objective lens 102 with the same amount of light and distribution of light within the pupil face.

According to the optical system 101 of the embodiment described above, the divergence point position of the beam L can be changed by moving the first lens 104; in effect that is, the position of the beam source is changed. The condensing point can be changed to a desired position while keeping the amount of light and the distribution of light within the pupil face constant, and generation of spherical aberration at that position (each condensing point) can be significantly suppressed.

Since this configuration merely moves the first lens group 104, it can be simplified while reducing the cost, and is not time-consuming.

FIGS. 15A to 15C show an example of a specific configuration including the first lens and the second lens described in the fifth embodiment. Each lens is set as shown in Table 1.

In Table 1, R is the curvature radius of the lens, d is the thickness or air space of the lens, and n is its refractive index.

TABLE 1

| Face Number | R | d | n |
|---|---|---|---|
| 1 | −10 | 1 | 1.50619 |
| 2 | ∞ | Interval d1 | |
| 3 | ∞ | 2 | 1.50619 |
| 4 | −30 | | |

Object Point Position ∞ (collimated rays are incident)
Distance from final lens face to entrance pupil position = 59.3

| | | | |
|---|---|---|---|
| Interval d1 | 27.519 | 37.519 | 47.519 |
| Beam source position seen from entrance pupil face of condensing optical system | −351.25 | ∞ | 351.25 |
| Focal point distance f1 of first lens | −19.8 | | |
| Focal point distance f2 of second lens | 59.3 | | |

Figure 16:
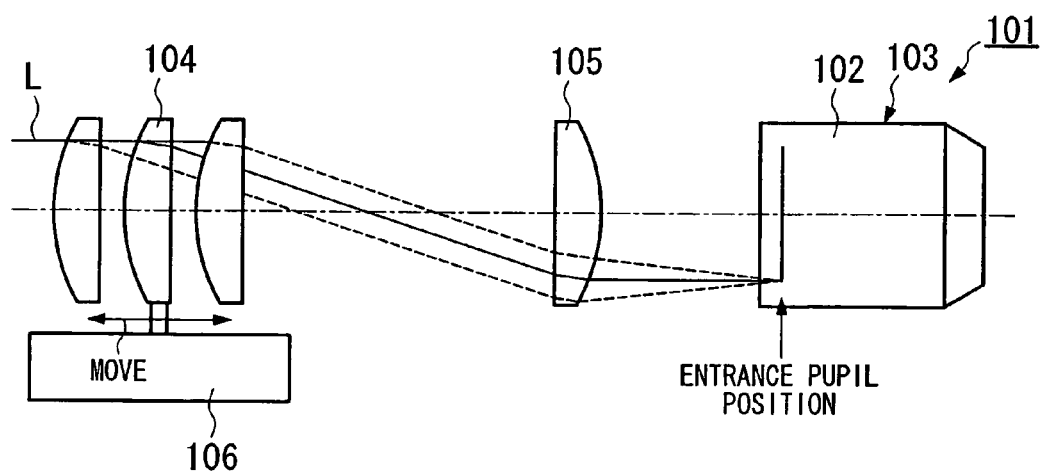
FIG. 16 is a diagram of a configuration of an optical system according to a sixth embodiment of this invention.

Subsequently, an optical system according to a sixth embodiment of this invention will be explained with reference to FIG. 16. In the sixth embodiment, constituent elements which are the same as those in the fifth embodiment are represented by the same reference codes and are not repetitiously explained.

The sixth embodiment differs from the fifth embodiment in that, while in the fifth embodiment, the first lens 104 is a double-concave lens, in the optical system of the sixth embodiment, the first lens 104 is a concave lens, and is arranged with its flat face side facing the second lens 105 side.

In this embodiment as in the first embodiment, regardless of the position of the first lens 104, the collimated rays of the incident beam L are always refracted at the same angle before being incident on the second lens 105. This embodiment consequently achieves the same operations and effects as the fifth embodiment.

Subsequently, an optical system according to a seventh embodiment of this invention will be explained with reference to FIG. 17. In the seventh embodiment, constituent elements which are the same as those in the sixth embodiment are represented by the same reference codes and are not repetitiously explained.

The seventh embodiment differs from the sixth embodiment in that, while in the sixth embodiment, the second lens group consists of a single concave lens (i.e. the second lens 105), in the optical system of the seventh embodiment, a second lens group 110 consists of two lenses 111 and 112.

Figure 17:
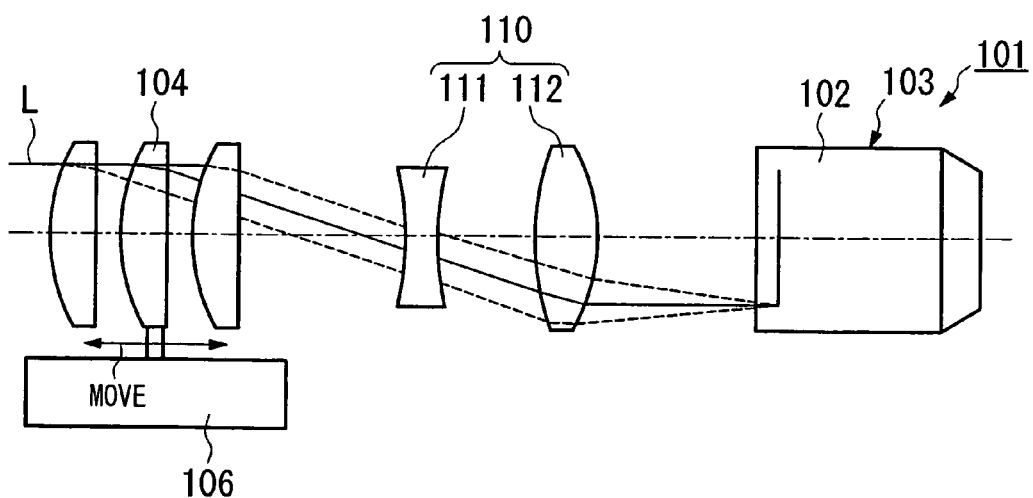
FIG. 17 is a diagram of a configuration of an optical system according to a seventh embodiment of this invention.

As shown in FIG. 17, the second lens group 110 of this embodiment includes a double-concave lens 111 arranged on the first lens group (first lens 104) side and a double-convex lens 112 arranged adjacent to this double-concave lens 111. The rear side focal point position of the entire second lens group 110 is positioned in the vicinity of the entrance pupil position of the objective lens 102.

The optical system of this embodiment can obtain the same operations and effects as the second embodiment. In addition, the interval (distance) between the second lens group 110 and the objective lens 102 can be increased, enabling another observation system and the like to be arranged between them and increasing the freedom of the design.

FIGS. 18A to 18C are examples of a specific configuration including the first lens group and the second lens group described in the third embodiment. The lenses are set as shown in Table 2.

In Table 1, R is the curvature radius of the lens, d is the thickness or air space of the lens, and n is its refractive index.

TABLE 2

| Face Number | R | d | n |
|---|---|---|---|
| 1 | 20.2477 | 2 | 1.50619 |
| 2 | ∞ | Interval d2 | |
| 3 | −11.9178 | 1 | 1.50619 |
| 4 | ∞ | 12.983 | |
| 5 | ∞ | 2 | 1.50619 |
| 6 | −12.2735 | | |

Object Point Position ∞ (collimated rays are incident)
Distance from final lens face to entrance pupil position = 65.44

| | | | |
|---|---|---|---|
| Interval d2 | 43.97 | 53.97 | 63.97 |
| Beam source position seen from entrance pupil face of condensing optical system | −160 | ∞ | 160 |
| Focal point distance f1 of first lens | 40 | | |
| Focal point distance f2 of second lens | 40 | | |

As shown in Table 2 and FIGS. 18A to 18C, by using concave lenses and convex lenses for the second lens group, the distance from the final face of the second lens group to the rear side focal length of the second lens group can be made longer than 40 mm, which is the focal distance of the second lens group.

Subsequently, an optical system according to an eighth embodiment of this invention will be explained with reference to FIGS. 19A to 19C. In the eighth embodiment, constituent elements which are the same as those in the fifth embodiment are represented by the same reference codes and are not repetitiously explained.

The eighth embodiment differs from the fifth embodiment in that, while in the fifth embodiment, the first lens group includes one double-concave lens (the first lens 104), in contrast in the eighth embodiment, a first lens group 115 includes two lenses 116 and 117.

Figure 19A:
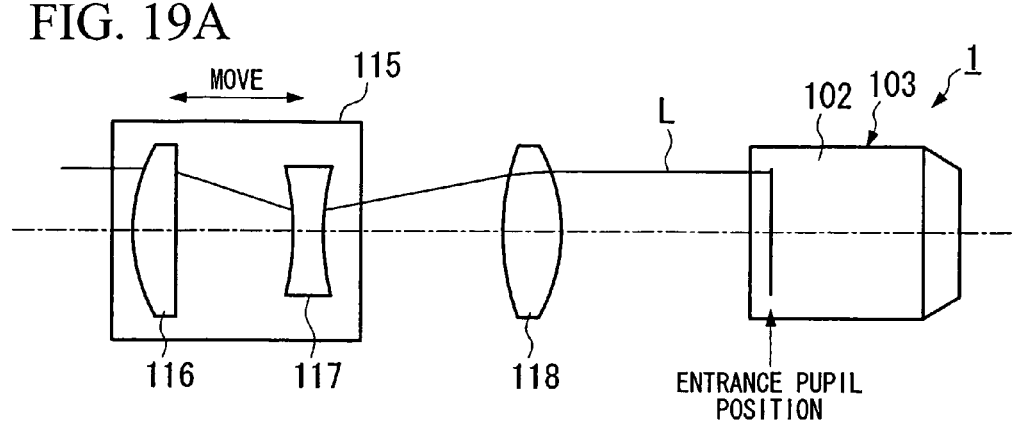
FIGS. 19A to 19C are diagrams of a configuration of an optical system according to an eighth embodiment of this invention.
Figure 19B:
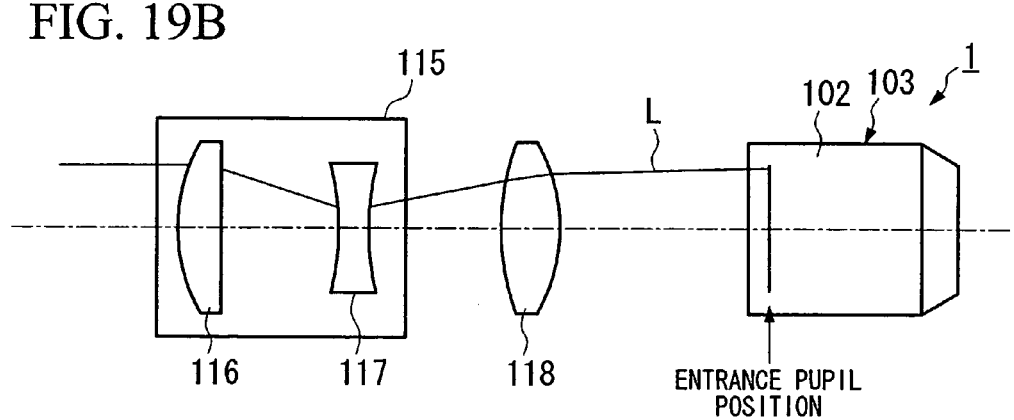
Figure 19C:
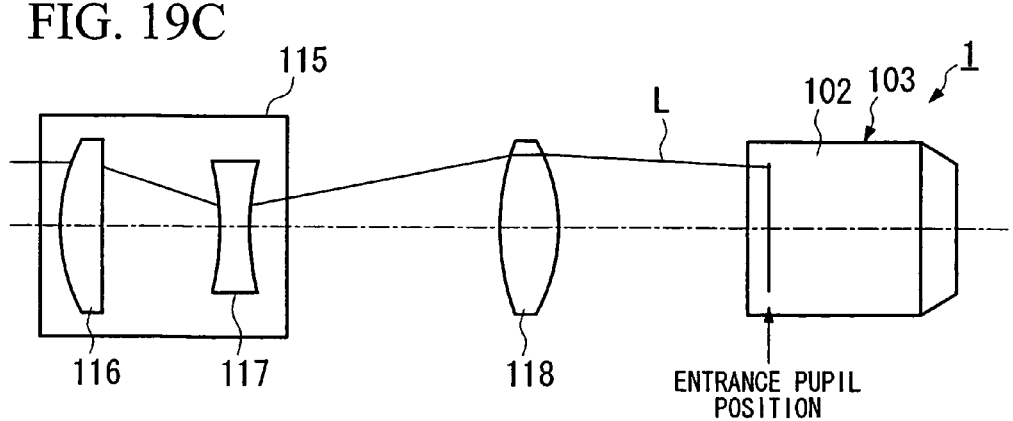

As shown in FIGS. 19A to 19C, the first lens group 115 consists of a convex lens 116 arranged with its convex part facing the emitting unit side, and a double-concave lens 117 arranged adjacent to the convex lens 116. The second lens group of this embodiment consists of one double-convex lens 118.

In this embodiment, as in the fifth embodiment, the collimated incident beam L is always refracted at the same angle irrespective of the position of the first lens group 115 before being incident on the second lens 118, thereby obtaining the same operations and effects as the first embodiment.

Moreover, if f1 is the combined focal distance of the first lens group 115 formed by the two lenses 116 and 117, and f2 is the focal distance of the single double-convex lens 118, when |f1|=|f2|, the diameter of the beam which is incident on the entrance pupil of the objective lens 102 can be kept equal to the diameter of the beam which is incident on the first lens group 115 while obtaining the same effects of the fifth embodiment.

Figure 20:
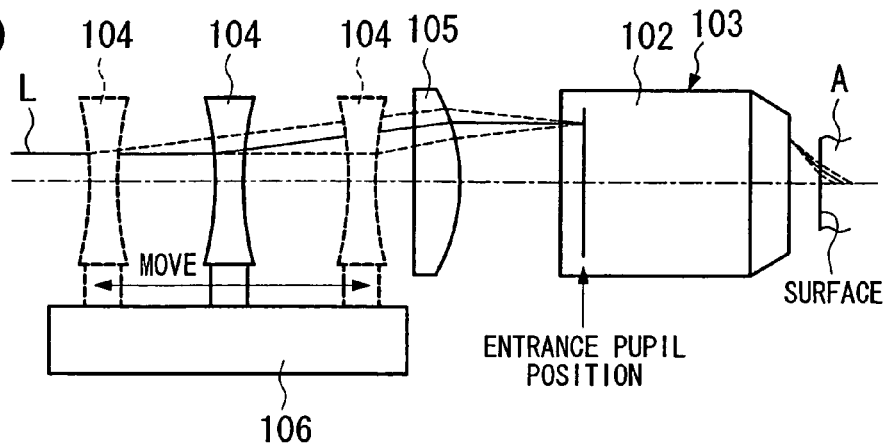
FIG. 20 is a diagram of a configuration of an optical system according to a ninth embodiment of this invention.

Subsequently, an optical system according to a ninth embodiment of this invention will be explained with reference to FIGS. 20 and 21. In the ninth embodiment, constituent elements which are the same as those in the fifth embodiment are represented by the same reference codes and are not repetitiously explained.

The ninth embodiment differs from the fifth embodiment in that, while in the fifth embodiment, the beam L is merely condensed at a desired position, in contrast in the optical system of the ninth embodiment, the beam L is condensing at different depths from the surface of the medium (sample).

That is, in the optical system of this embodiment, the objective lens 102 condenses the beam L in the medium, and the moving unit 106 moves the first lens 104 (first lens group) in accordance with the refractive index of the condensing medium A and the distance from the surface of the medium to the condensing position.

An example where the beam L is condensed at positions of different depths from the surface of the medium A using the optical system of this configuration will be explained.

Figure 21:
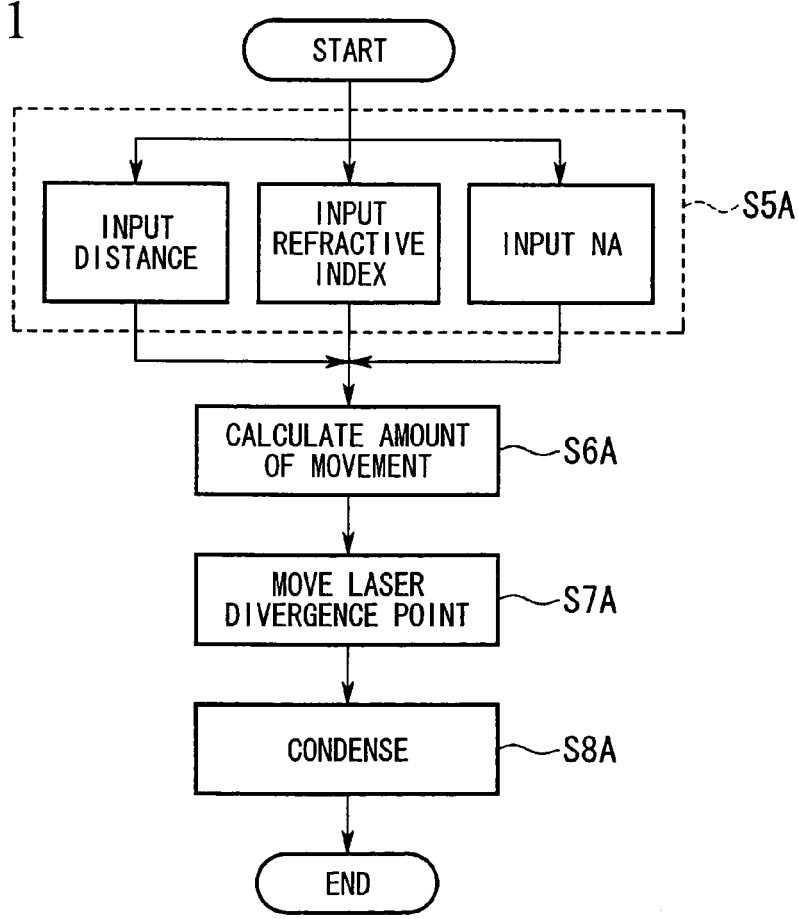
FIG. 21 is an example of a flowchart when using the same optical system in condensing rays at a desired position.

Firstly, as shown in FIG. 21, the refractive index of the medium A, the distance from the surface of the medium to the condensing position (e.g. 50 μm), and the NA of the condensing optical system 103, are input to the input unit of the controller (step S5A).

Based on this input data, the calculator calculates the amount of movement of the first lens 104 (step S6A). Following this calculation, the controller moves the moving unit 106 in the optical axis direction based on the calculated result, thereby moving the first lens 104 to a predetermined position (step S7A).

After moving the first lens 104, the controller makes the emitting unit emits the beam L in a collimated (parallel) state. Consequently, the beam L is condensed at a desired position from the surface of the medium A while significantly suppressing the amount of spherical aberration that is generated (step S8A).

As described above, since the beam L is condensed after moving the first lens 104 in accordance with the distance input to the input unit, the beam L can be condensed at a desired depth while further suppressing the amount of spherical aberration that is generated, thereby enhancing the condensing performance.

Figure 22A:
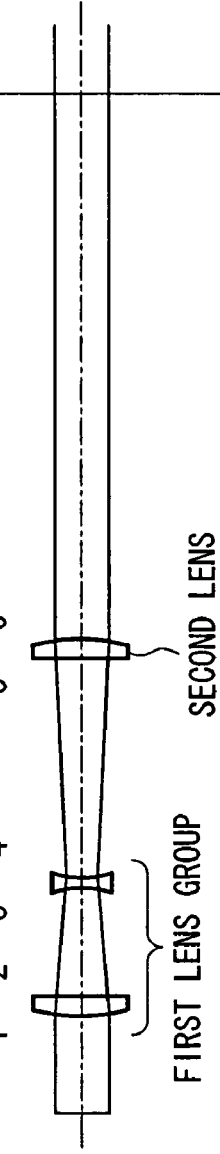
FIGS. 22A to 22C are diagrams of a specific configuration of a first lens and a second lens described in the optical system according to the ninth embodiment of this invention.
Figure 22B:
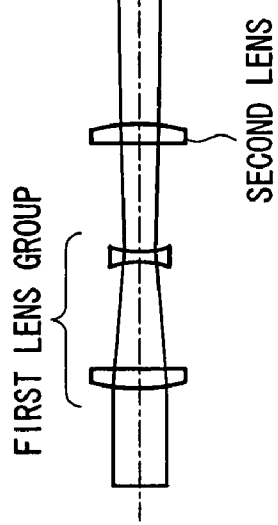
Figure 22C:
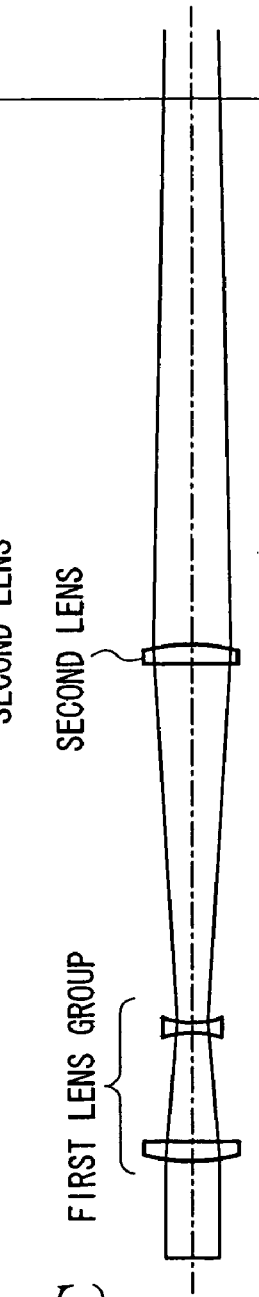

FIGS. 22A to 22C are examples of a more specific configuration of the first lens group and the second lens described in the ninth embodiment. The lenses are set as shown in Table 3.

In Table 3, R is the curvature radius of the lens, d is the thickness or air space of the lens, and n is its refractive index.

TABLE 3

| Face Number | R | d | n |
|---|---|---|---|
| 1 | 20.2477 | 2 | 1.50619 |
| 2 | ∞ | Interval d2 | |
| 3 | −11.9178 | 1 | 1.50619 |
| 4 | ∞ | 12.983 | |
| 5 | ∞ | 2 | 1.50619 |
| 6 | −12.2735 | | |

Object Point Position ∞ (collimated rays are incident)
Distance from final lens face to entrance pupil position = 65.44

| Interval d2 | 43.97 | 53.97 | 63.97 |
|---|---|---|---|
| Beam source position seen from entrance pupil face of condensing optical system | −160 | ∞ | 160 |
| Focal point distance f1 of first lens | −40 | | |
| Focal point distance f2 of second lens | 40 | | |

As shown in Table 3 and FIGS. 22A to 22C, convex lenses and concave lenses are used for the first lens group such that the absolute values of the combined focal distance of the first lens group f1=−40 and the combined focal distance of the second lens group f2=40 become equal. With this configuration, the diameter of the beam which is incident on the first lens group can be made approximately the same as the diameter of the beam at the ear side focal length of the second lens without condensing the beam near the first lens group and the second lens group.

Figure 23:
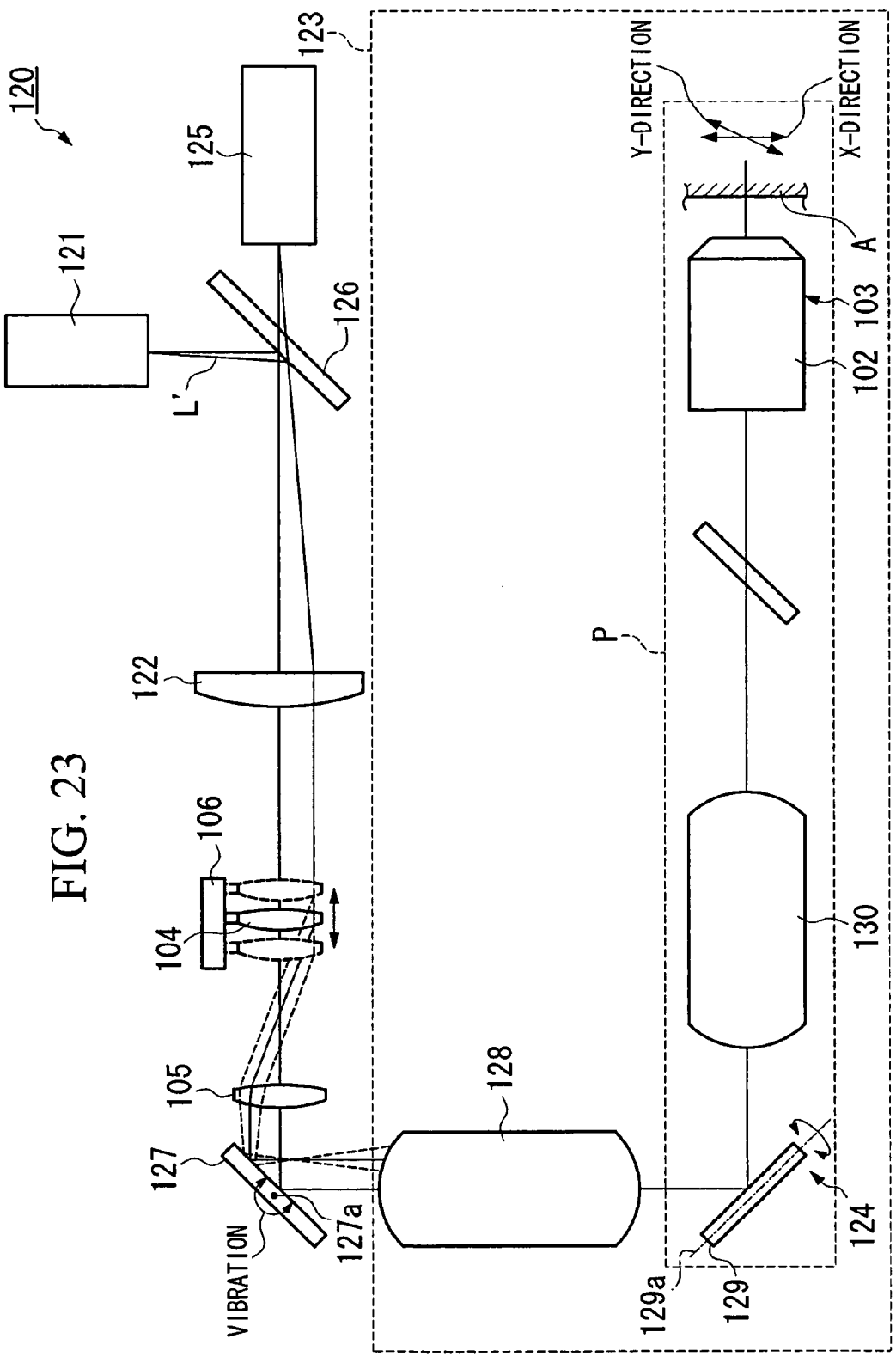
FIG. 23 is a diagram of a configuration of an optical system according to a tenth embodiment of this invention.

Subsequently, an optical system according to a tenth embodiment of this invention will be explained with reference to FIG. 23. In the tenth embodiment, constituent elements which are the same as those in the ninth embodiment are represented by the same reference codes and are not repetitiously explained.

The tenth embodiment differs from the ninth embodiment in that, while in the ninth embodiment, the beam L is merely condensed at positions of different depths from the surface of the medium A, in contrast in the optical system of the tenth embodiment, a laser beam L' is condensed at different depths from the surface of the medium A and then recondensed for observation.

A laser optical system (optical system) 120 of this embodiment includes a laser beam source 121 which emits the laser beam L', an imaging lens (collimating unit) 122 which collimates the rays of the laser beam L' emitted from the laser beam source 121 into parallel rays, a condensing optical system 123 which condenses the collimated rays of the laser beam L' in the medium and recondenses light from the condensing point, a scanning unit 124 which can scan a condensing point in the medium in a direction perpendicular to the optical axis of the laser beam L' (horizontal direction, XY direction), and a photodetector 125 which is arranged at a position conjugate with the laser beam source 121 and detects the light recondensed by the condensing optical system 123.

Incidentally, the medium A is mounted on an unillustrated stage which can be moved in the XY direction. Although FIG. 23 depicts the entire optical system within a two-dimensional plane, the section P (shown by a broken line) is actually perpendicular to the paper.

The condensing optical system 123 includes a half mirror 126 which reflects the laser beam L' emitted from the laser beam source 121 by changing the direction of its optical axis by 90 degrees, the abovementioned imaging lens 122 which collimates the laser beam L' reflected from the half mirror 126, a first galvanometer mirror 127 which reflects the laser beam L' at different angles such that it can be scanned in one direction (X direction) which is horizontal to the surface of the medium A, a first pupil relay optical system 128 which relays the laser beam L' reflected by the first galvanometer mirror 127, a second galvanometer mirror 129 which reflects the laser beam L' which passes the first pupil relay optical system 128 at different angles such that it can be scanned in another direction (Y direction) which is horizontal to the surface of the medium A, a second pupil relay optical system 130 which relays the laser beam L' reflected by the second galvanometer mirror 129, and an objective lens 102 which condenses the laser beam L' which passes the second pupil relay optical system 130 onto the sample and recondenses light from the condensing point.

The first galvanometer mirror 127 and the second galvanometer mirror 129 respectively have, at their central positions, rotation axes 127a and 129a which are arranged facing in mutually orthogonal directions, and vibrate around these rotation axes 127a and 129a within predetermined angles. This vibration enables the laser beam L' to be reflected at different angles as mentioned above. By combining the galvanometer mirrors 127 and 129, the laser beam L' can be scanned in a direction orthogonal to the optical axis direction of the condensing optical system 4 (i.e. the XY direction). That is, the galvanometer mirrors 127 and 129 function as the scanning unit 124. The vibration (operation) of the galvanometer mirrors 127 and 129 is controlled by the controller.

The photodetector 125 is arranged on the rear side of the half mirror 126.

A first lens group of this embodiment consists of a single double-convex first lens 104, which is arranged in the collimated beam between the imaging lens 122 and the first galvanometer mirror 127 and can be moved in the optical axis direction. The second lens group consists of a single double-convex second lens 105, which is arranged in the collimated beam between the first lens 104 and the first galvanometer mirror 127 such that its rear side focal length is in the vicinity of the entrance pupil position of the entire condensing optical system 123.

Figure 24A:
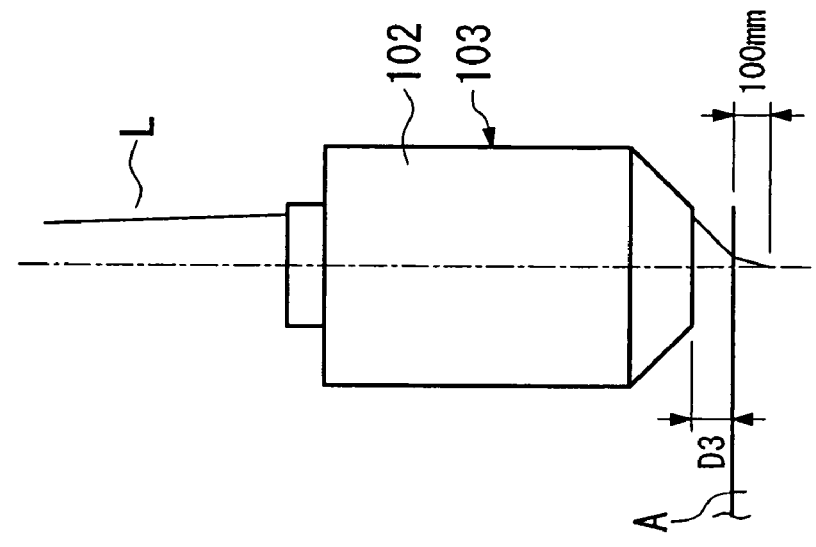
FIGS. 24A to 24C shows diagrams of states where the same optical system is used in condensing a laser beam at positions at different depths from the surface of a medium, FIG. 24A being a position at 50 µm from the surface, FIG. 24B being a position at 75 µm, and FIG. 24C being a position at 100 µm.
Figure 24B:
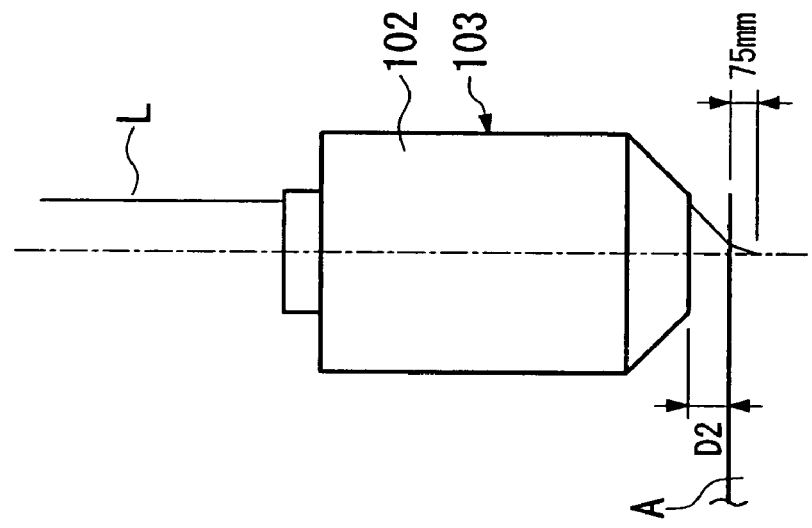
Figure 24C:
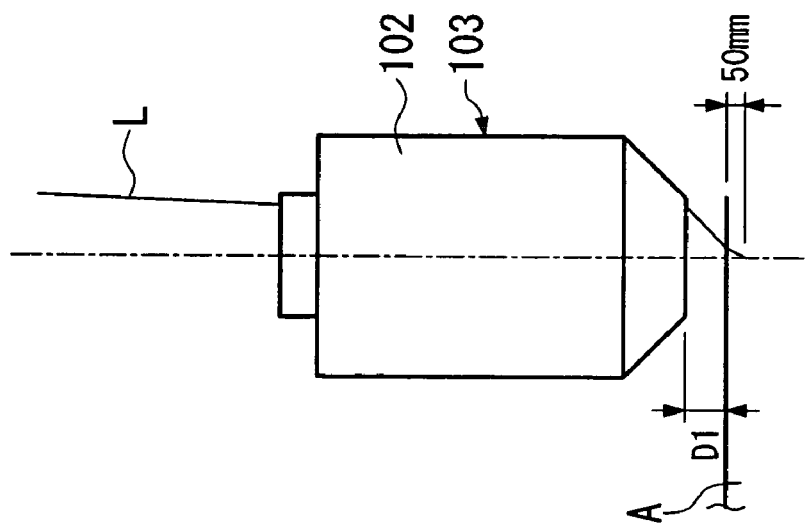

An example of observing positions at different depths from the surface of the medium A using the laser condensing optical system 120 of this configuration will be explained. In the example of FIGS. 24A to 24C, this embodiment observes positions at depths of 50 μm, 75 μm, and 100 μm from the surface of the medium A.

As shown in FIG. 24A, to observe a position at a depth of 50 μm from the surface of the medium A, the refractive index of the medium A, the distance from the surface of the medium A to the condensing position (i.e. 50 μm), the NA of the condensing optical system 123, and the distance between the objective lens 102 and the surface of the medium A (i.e. the WD) are input to the input unit of the controller. Based on this input data, the calculator calculates the amount of movement of the first lens 104. After this calculation, based on the calculated results, the controller controls the moving unit 106 such that it moves in the optical axis direction, thereby moving the position of the first lens 104 to a predetermined position.

After moving the first lens 104, the controller sends a signal to the laser beam source 121 and makes it emit the laser beam L'. The emitted laser beam L' is reflected by the half mirror 126 and collimated to a parallel state by the imaging lens 122 before being made incident on the first lens 104, which is arranged at the predetermined position. The laser beam L' is converged after being refracted by the first lens 104, and is refracted again by the second lens 105 before being incident on the first galvanometer mirror 127. The first galvanometer mirror 127 reflects the laser beam L' at different angles toward the X direction of the surface of the medium A. The reflected laser beam L' passes through the first pupil relay optical system 128 and is reflected by the second galvanometer mirror 129 at different angles toward the Y direction of the surface of the medium A. The reflected laser beam L' passes the second pupil relay optical system 130 and is incident on the objective lens 102. As shown in FIG. 24A, the objective lens 102 condenses the laser beam L' at a position of 50 μm from the surface of the medium.

As already mentioned, since the position of the first lens 104 corresponding to a depth of 50 μm, namely the actual position of the beam source (position of convergence point), is changed, the amount of spherical aberration generated at the position at a depth of 50 μm can be significantly suppressed, whereby the laser beam L' can be efficiently condensed at that position.

Light from the condensing point is recondensed by the objective lens 102 and travels along the reverse optical path described above before being detected by the photodetector 125. That is, the light recondensed by the objective lens 102 passes through the second pupil relay optical system 130, is reflected by the second galvanometer mirror 129, passes through the first pupil relay optical system 128, is reflected by the first galvanometer mirror 127, passes through the second lens 105 and the first lens 104, passes through the imaging lens 122 and the half mirror 126, and is then detected via a pinhole by the photodetector 125. The light recondensed by the objective lens 102 is reflected by the galvanometer mirrors 127 and 129 such that it travels along the same optical path as the laser beam L'.

As described above, since the laser beam L' is condensed at the condensing point (a position at a depth of 50 μm from the surface of the medium) while significantly suppressing the amount of spherical aberration generated, the photodetector 125 can obtain an observation image with little error. This makes the observation highly precise.

Since the galvanometer mirrors 127 and 129 scan the laser beam L' toward the horizontal direction (XY direction) of the surface of the medium A, the entire surface of the medium A can be easily observed over a wide range. This makes it possible to scan the entire medium A without moving the medium side (stage side).

To observe positions at depths of 75 μm and 100 μm from the surface of the medium A, the refractive index of the medium A, the distance from the surface of the medium A to the condensing position (75 μm and 100 μm), the NA of the condensing optical system 123, and WD are input to the input unit of the controller in the same manner as above. Based on a result calculated by the calculator, the controller controls the moving unit 106 such that it moves in the optical axis direction, thereby moving the position of the first lens 104 to a predetermined position. The laser beam L' is emitted and condensed at a position of 75 μm (or 100 μm) from the surface of the medium A. In addition, light from the condensing point is recondensed and detected by the photodetector 125.

As in the above case, since the divergence point is adjusted by moving the first lens 104 in accordance with the depths of 75 μm and 100 μm, the amount of spherical aberration generated at each position can be significantly suppressed. As shown in FIGS. 24B and 24C, this enables the laser beam L' to be efficiently condensed at the positions of 75 μm and 100 μm. Therefore, a highly precise observation image can be obtained.

In changing the WD, the controller adjusts the WD by, for example, moving the stage in the optical axis direction.

As described above according to the surface layer member 120 of this embodiment, when condensing the laser beam L' at different depths from the surface of the medium A, the moving unit 106 moves the first lens 104 (i.e. the divergence point) along the optical axis direction in accordance with the refractive index of the medium A and the distance from its surface to the condensing position. This significantly suppresses the amount of spherical aberration that is generated, and enables the laser beam L' to be efficiently condensed in an optimal state at each depth. Therefore, even if the depth from the surface of the medium A is changed, an observation image with little error can be obtained at each position and the medium A can be observed with high precision.

Figure 25:
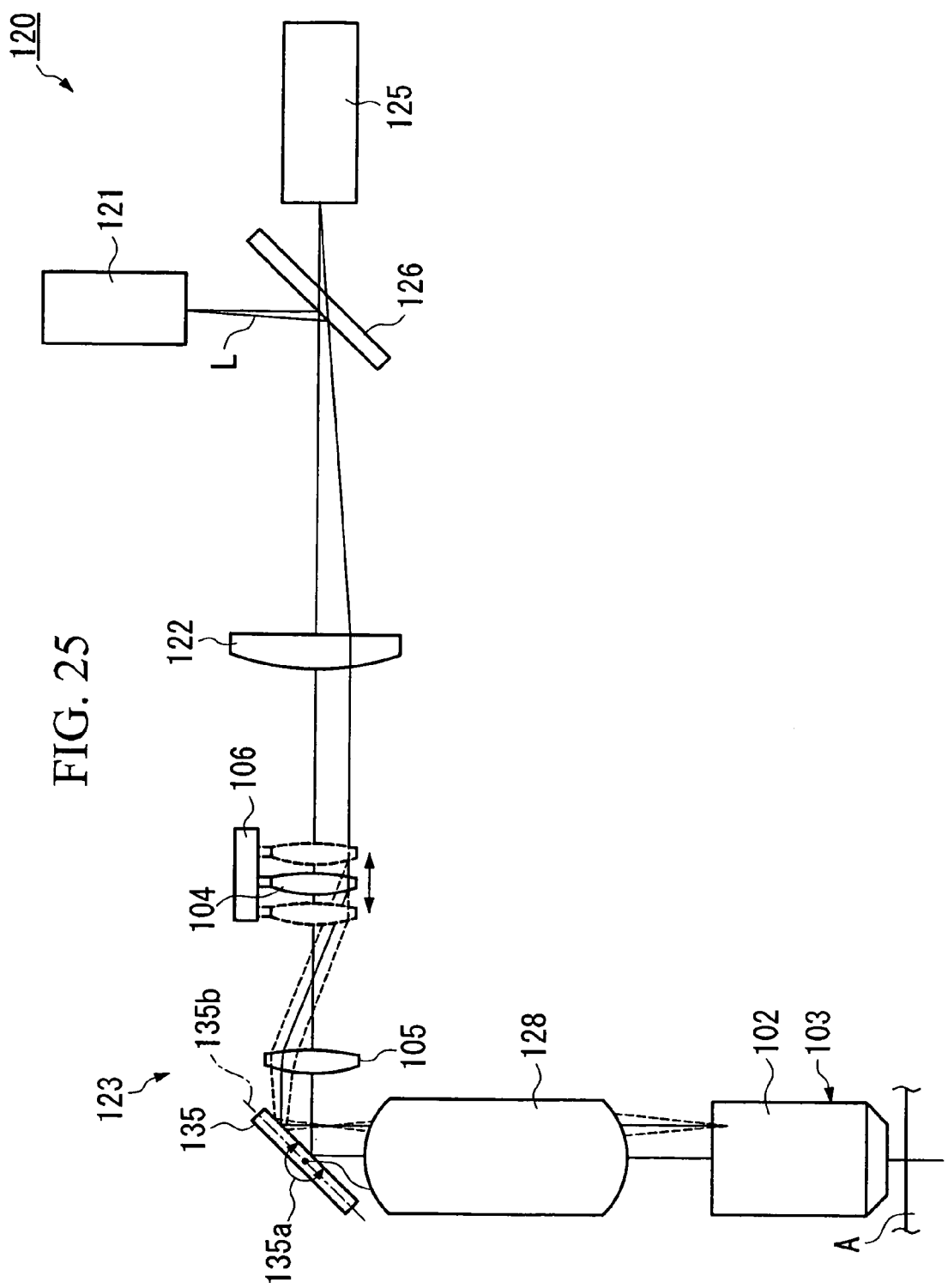
FIG. 25 is a modification of the same optical system, being an example of an optical system which uses a two-dimensional galvanometer mirror.

While the tenth embodiment uses the first galvanometer mirror 127 and the second galvanometer mirror 129 as the scanning unit 124, there is no limitation on this. As shown by way of example in FIG. 25, a two-dimensional galvanometer mirror 135 may be used as the scanning unit 124. The two-dimensional galvanometer mirror 135 has two rotation axes 135a and 135b which face in the same directions as the rotation axes 127a and 129a of the first galvanometer mirror 127 and the second galvanometer mirror 129, and vibrates two-dimensionally around these rotation axes 135a and 135b at predetermined angles.

Therefore, since there is no need to provide two galvanometer mirrors and two pupil relay optical systems as in the tenth embodiment, the configuration can be further simplified and the cost can be reduced.

It should be understood that this invention is not limited to the fifth embodiment to the tenth embodiment mentioned above, and that various modifications can be made without departing from the spirit or scope of this invention. For example, the first lens group and the second lens group may consist of a single lens as in the fifth embodiment, or as more than one lens as in the seventh and eighth embodiments. The lens types are not limited to, for example, convex, concave, or double-convex, and may be freely combined and designed.

In particular in the fifth embodiment to the tenth embodiment, the moving unit should be set to move the first lens group such as to satisfy the following equation.

$$1/|f|<0.01$$

where $|f|$ is the combined focal distance of the first lens group and the second lens group. This makes it possible to add an afocal section.

In the fifth embodiment to the tenth embodiment, the second lens group should be set such that it satisfies the following equation.

$$f2>0$$

where f2 is the focal distance of the second lens group.

While the entrance pupil position of a condensing optical system is often inside the condensing optical system itself, even if that is the case, the position of the rear side focal point of the second lens group can be matched with the entrance pupil position of the condensing optical system by making the second lens group positive power (convex lens).

In the fifth embodiment to the tenth embodiment, the first lens group and the second lens group should be set such that they satisfy the following equations.

$$f1<0$$

$$\text{and } 1 \leq |f2/f1| \leq 5$$

where f1 is the focal distance of the first lens group and f2 is the focal distance of the second lens group.

By giving negative power (concave lens) to the first lens group and positive power (convex lens) to the second lens group, the configuration can be made more compact. Furthermore, since $1 \leq f2/f1$, the first lens group can be simply configured. This not only enables it to be made inexpensive but also suppresses performance degradation. Moreover, since $f2/f1 \leq 5$, the optical system can be configured compactly.

The settings for the first lens group and the second lens group are not limited to f1<0 and $1 \leq |f2/f1| \leq 5$ as described above. For example, in the fifth embodiment to the tenth embodiment, they may be set such as to satisfy the following equations.

$$f1>0$$

$$\text{and } 0.5 \leq |f1/f2| \leq 2$$

This enables the focal distance of both lens groups to be made positive, simplifying the configuration and achieving relay near to equimagnification.

While in the fifth embodiment to the tenth embodiment, the controller controls the moving unit automatically, the moving unit could be operated such as to move the position of the first lens group based on a calculation made by the controller.

Figure 26:
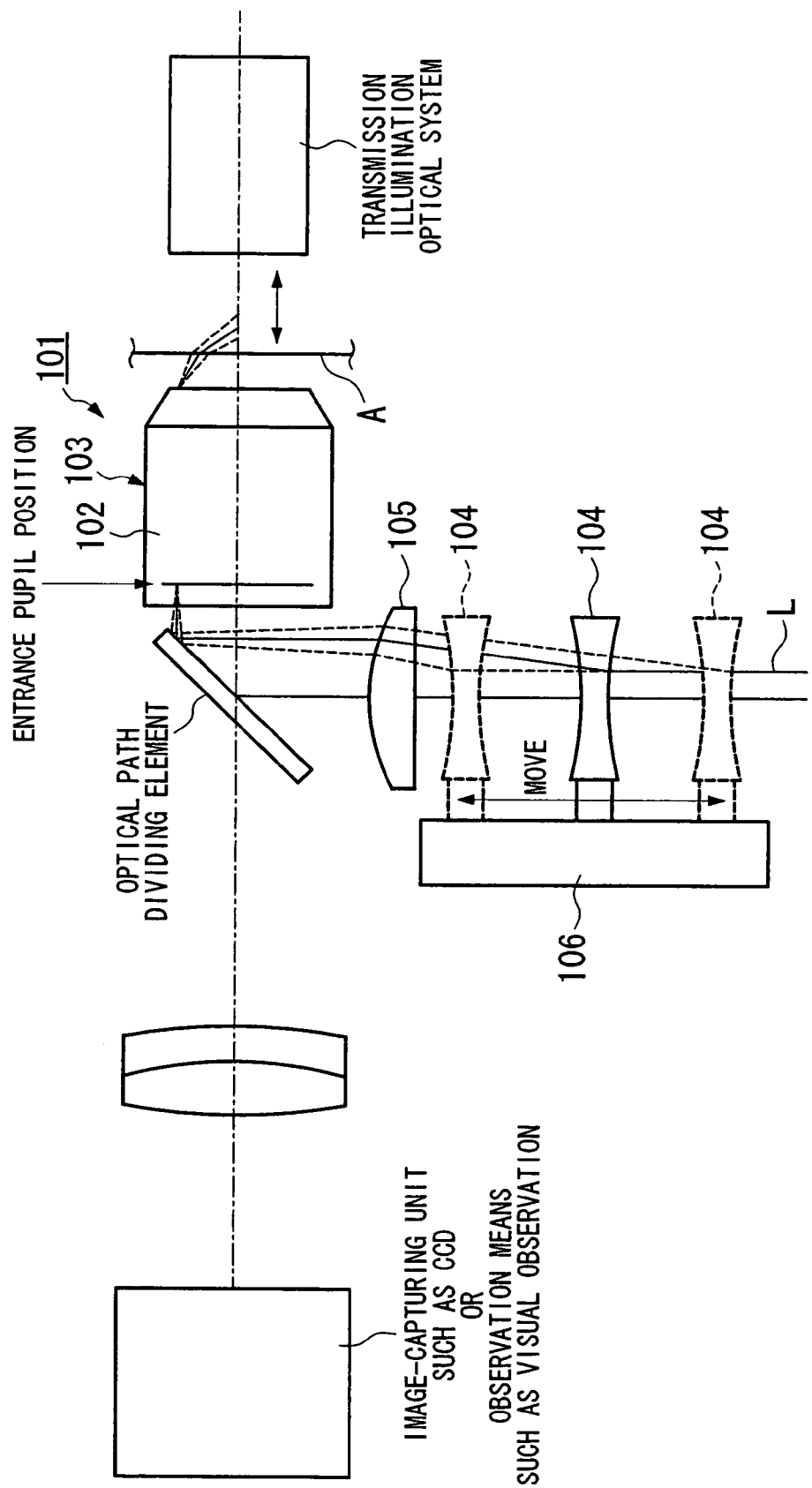
FIG. 26 is a diagram of an example where the optical system according to this invention is used in an optical tweezers optical system.

The optical system of this invention may be utilized in an optical tweezers optical system such as that shown in FIG. 26. In this case, since the amount of spherical aberration generated can be suppressed, supplement minute bodies in water and such like can be supplemented more precisely.

Figure 27:
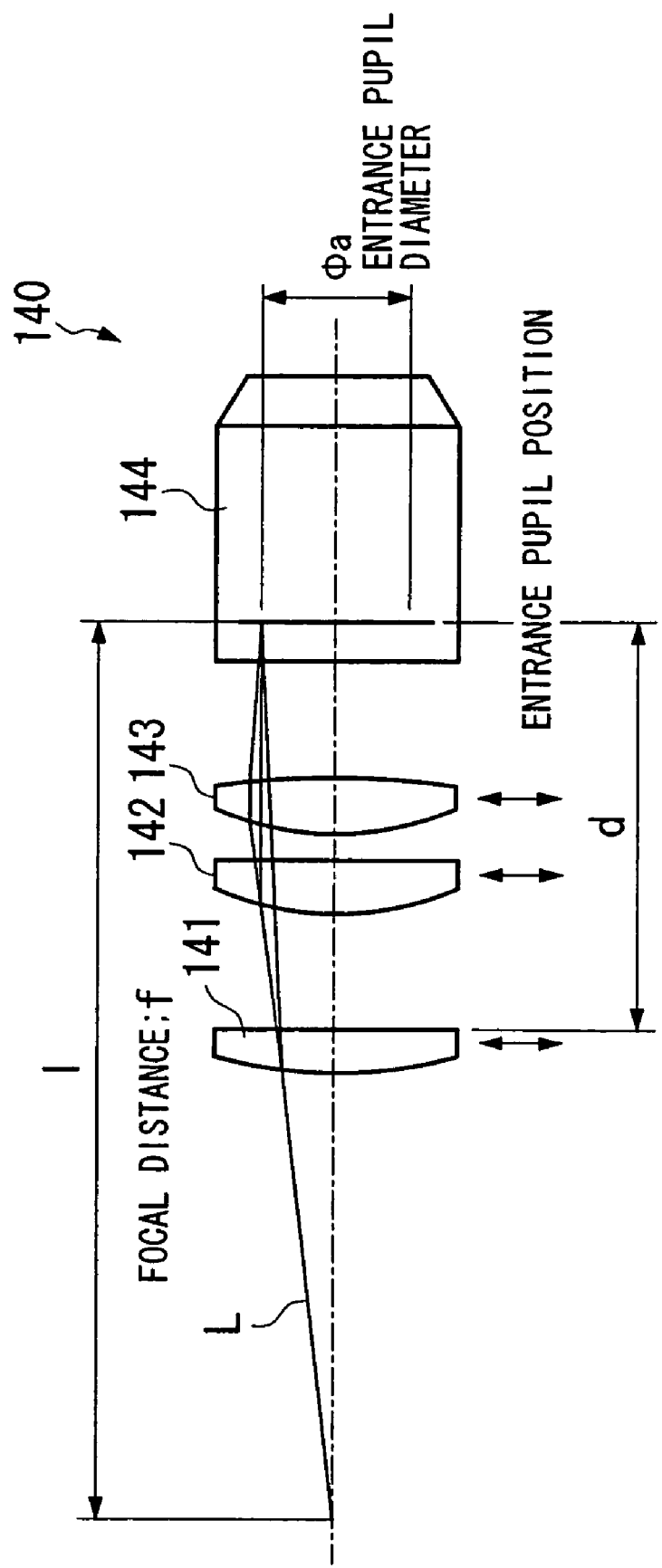
FIG. 27 is a diagram of an optical system in which a plurality of convex lenses is arranged in a path of divergent rays and can be inserted/removed therefrom.

An aberration-correcting optical system such as that shown in FIG. 27 may be used to correct spherical aberration. An aberration-correcting optical system 140 condenses a laser beam L from an unillustrated beam source, and includes a plurality of lenses 141, 142, and 143 which can be exclusively inserted/removed to/from the optical path and satisfy the following equation.

$$2(d^2+l\times f-l\times d)NA=f\times a$$

where d is the distance from the entrance pupil position of a condensing optical system 144 including an objective lens to the plurality of lenses 141, 142, and 143, l is the distance from the entrance pupil position of the condensing optical system 144 to the beam source position, f is the focal length of the plurality of lenses 141, 142, and 143, NA is the NA of the beam source (the NA seen from the condensing lens), and a is the entrance pupil diameter of the condensing optical system 144. The rays L are divergent, and the plurality of lenses 141, 142, and 143 are convex lenses.

In the aberration-correcting optical system 140 of this configuration, even when attempting to observe (condense) parts at different depths in a medium using a diverging beam source, observation (condensing) can be performed while suppressing the amount of spherical aberration generation with a constant intensity and a constant intensity distribution in the pupil face. Furthermore, there is no need for operations such as combining an expensive objective lens such as an objective lens with a correction ring and replacing glasses having different thicknesses.

Figure 28:
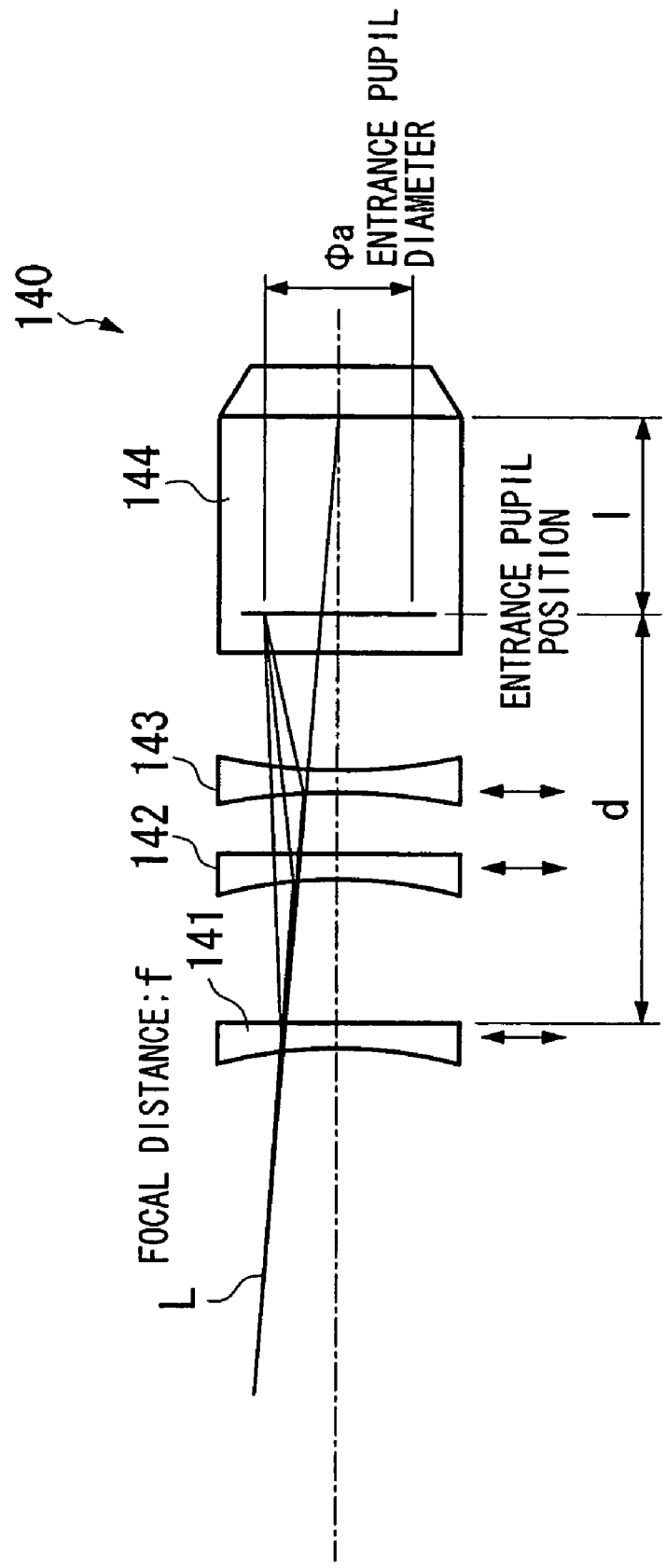
FIG. 28 is a diagram of an optical system in which a plurality of convex lenses is arranged in a path of convergent rays and can be inserted/removed therefrom.

While the aberration-correcting optical system 140 shown in FIG. 27 arranges the plurality of convex lenses 141, 142, and 143 in divergent rays, the plurality of lenses 141, 142, and 143 may instead be arranged in convergent rays as shown in FIG. 28. In this case, the plurality of lenses 141, 142, 143, should be concave lenses.

Figure 29:
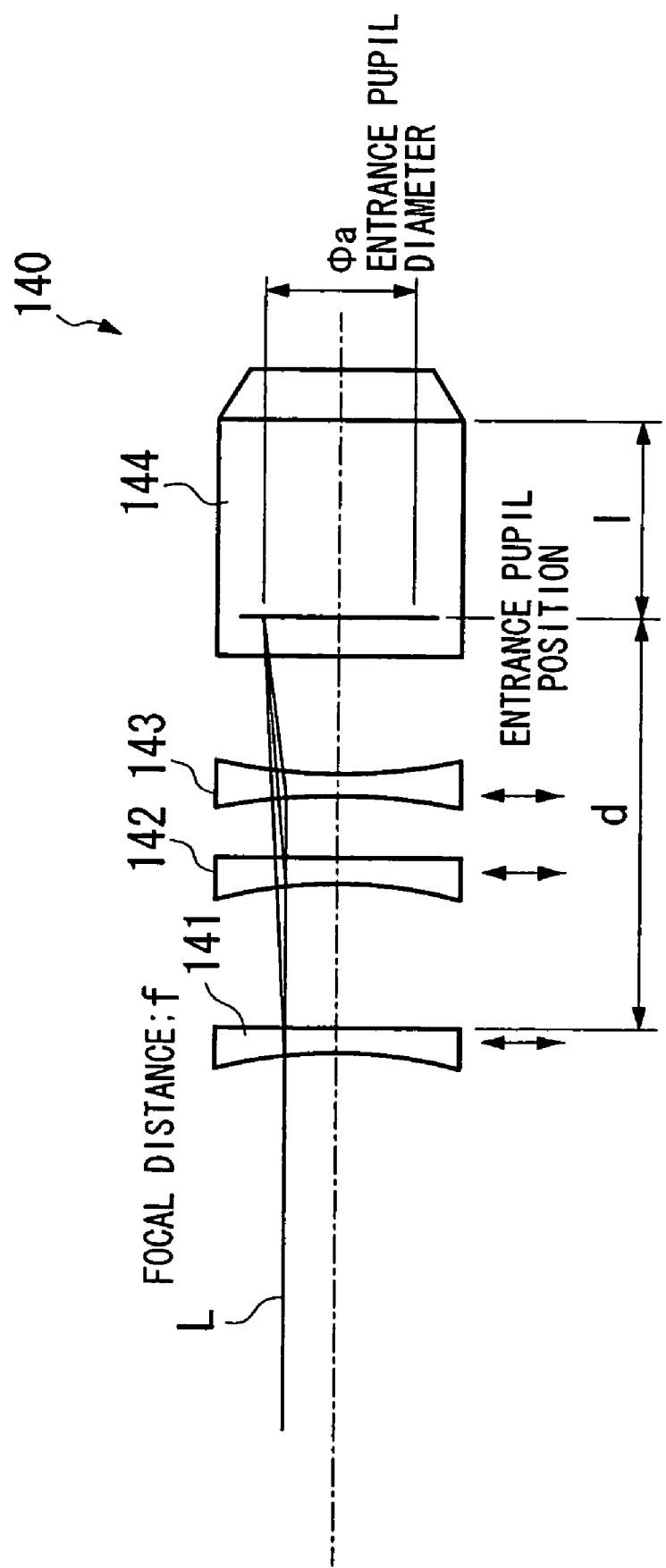
FIG. 29 is a diagram of an optical system in which a plurality of concave lenses are arranged in a path of collimated rays and can be inserted/removed therefrom.

The plurality of concave lenses 141, 142, and 143 may be arranged in collimated rays as shown in FIG. 29.

Figure 30:
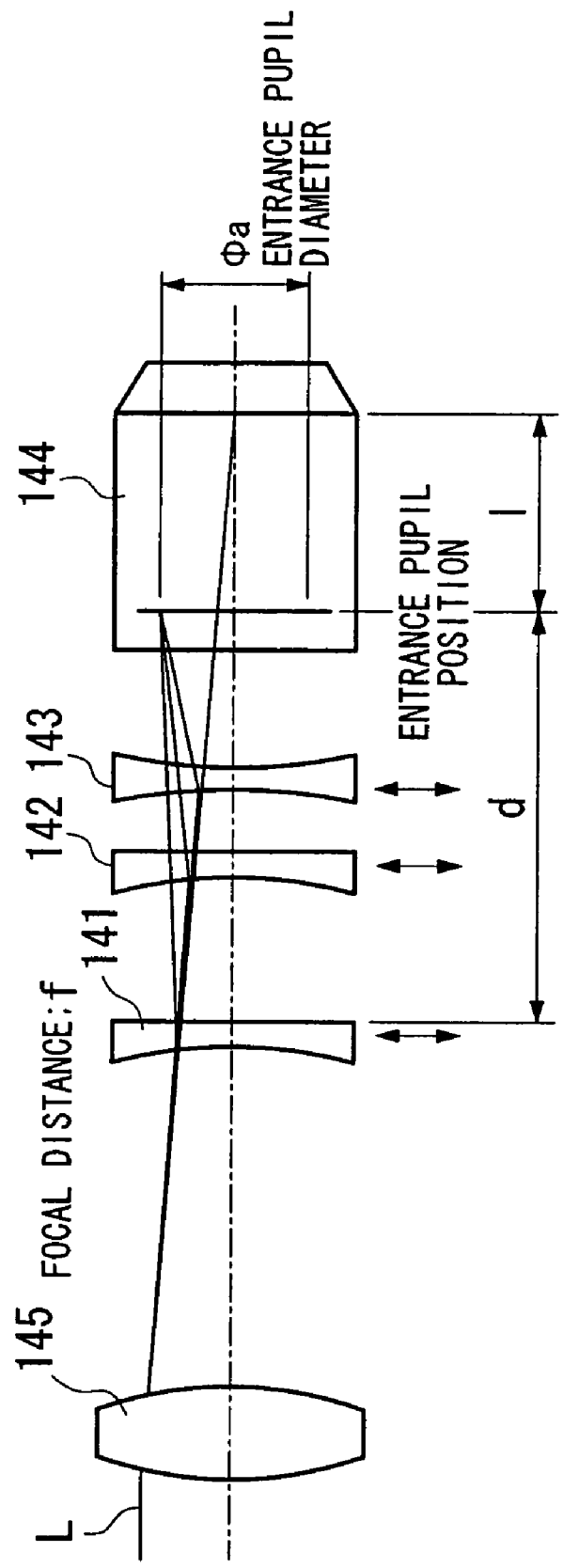
FIG. 30 is a diagram of an optical system in which collimated rays are converted to convergent rays by a convex lens, and a plurality of concave lenses are arranged in these convergent rays and can be inserted/removed therefrom.

Moreover as shown in FIG. 30, the plurality of lenses 141, 142, and 143 may be arranged after a convex lens which converts a collimated beam to a divergent beam.

Figure 31:
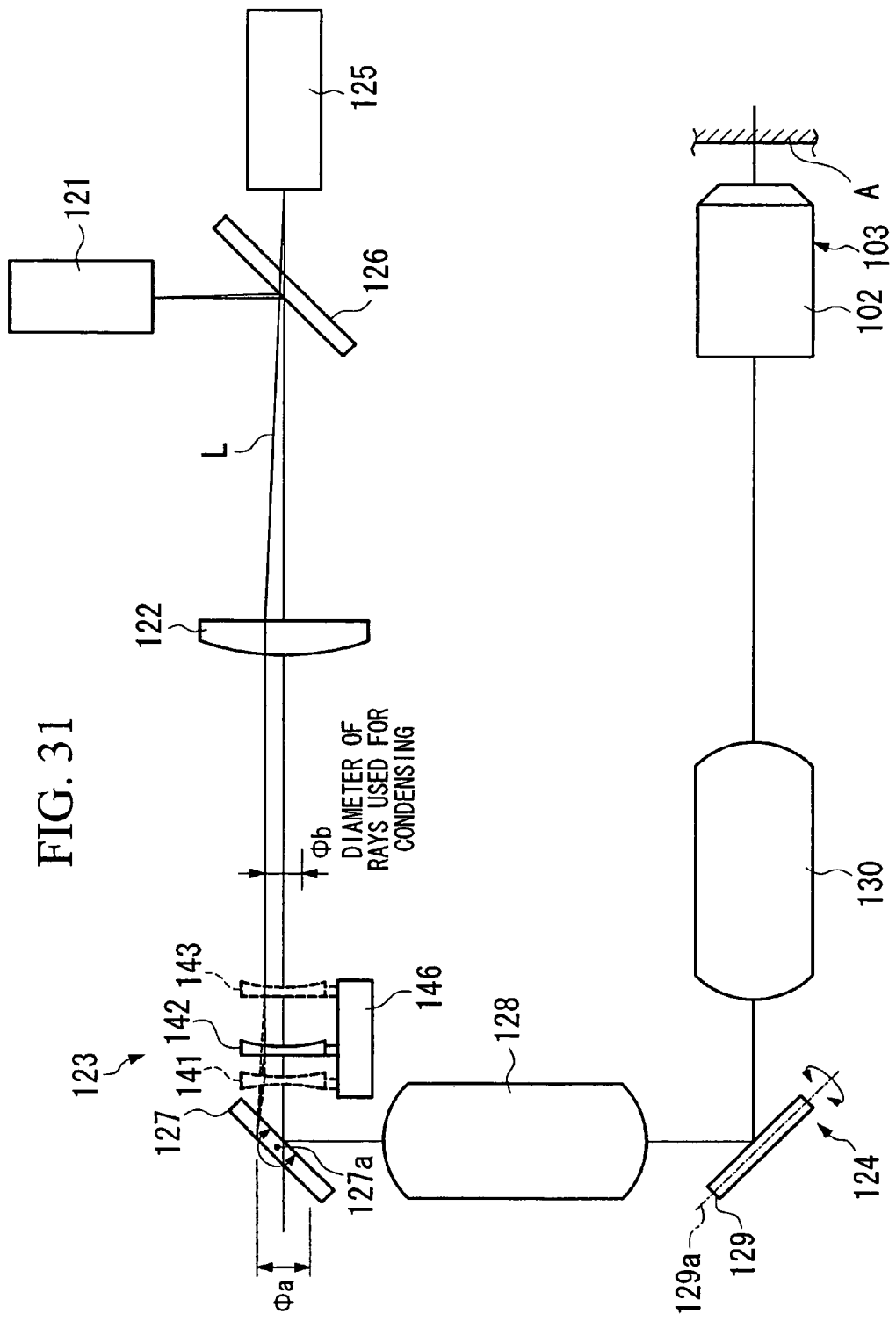
FIG. 31 is a diagram of an optical system in which a plurality of concave lenses is combined with the optical system of FIG. 23 and can be inserted/removed therefrom.
Figure 32:
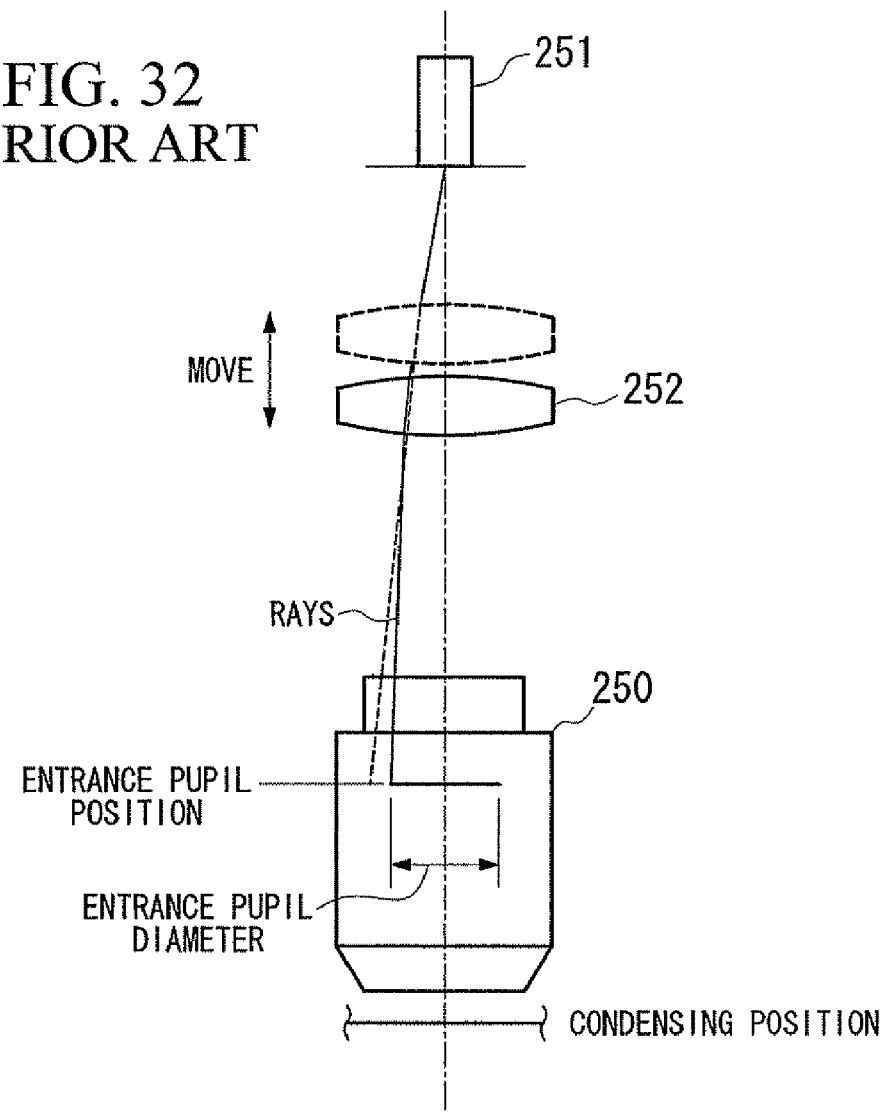
FIG. 32 is an explanatory diagram of conventional spherical aberration correction, being an example of an optical system which enables a spherical aberration correcting lens to be moved in an optical axis direction.
Figure 33:
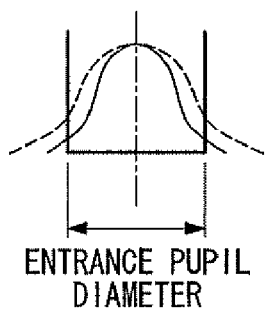
FIG. 33 is a diagram of change in intensity at an entrance pupil position in the optical system of FIG. 32.

As shown in FIG. 31, the aberration-correcting optical system 140 may be used in combination with the laser condensing optical system of the tenth embodiment. Here, the plurality of lenses 141, 142, and 143 are inserted and removed by a lens inserting/removing mechanism 146.

This configuration obtains the same operations and effects as the tenth embodiment.

The present invention can be summarized as follows.

A laser condensing optical system of this invention includes a laser beam source which emits a laser beam; a condensing optical system arranged between the laser beam source and a medium, the condensing optical system condensing the laser beam in the medium and recondensing light from a condensing point; and a laser divergence point moving unit which moves the position of a laser divergence point of the laser beam along an optical axis of the laser beam in accordance with the refractive index of the medium in which the laser beam is condensed and the distance from a surface of the medium to a condensing position.

According to this laser condensing optical system, the condensing optical system can condense a laser beam emitted from the laser beam source in a medium and can recondense light from the condensing point, this recondensed light can be detected by the photodetector. At this time, the laser beam is incident on the condensing optical system in a divergent state (non-parallel state). That is, it is emitted from the laser beam source in a divergent state, or emitted from the laser beam source in a parallel state and then converted by an optical system consisting of various lenses and the like to a divergent state, before being incident on the condensing optical system. The position (point) where the laser beam changes to a divergent state is termed the divergence point. When condensing the laser beam, in accordance with the refractive index of the medium where it is condensed and the distance from the surface of the medium to the condensing position, the laser divergence point moving unit moves the position of the laser divergence point and the position of the photodetector along the optical axis of the laser beam such that, even if the laser beam is condensed at positions at different depths in the medium, the amount of spherical aberration generated at each position can be significantly suppressed. Therefore, the laser beam can be efficiently condensed at the desired depth in the medium, and the condensing performance can be enhanced.

Since the amount of spherical aberration generated can be significantly suppressed, light with little aberration can be recondensed and an accurate observation image can be obtained. Therefore, the medium can be observed with high precision.

In particular, since only the laser divergence point is moved, spherical aberration can be corrected easily without consuming time in the conventional manner. In addition, since a special optical system such as a conventional objective lens with a correction ring is not required, the configuration can be simplified while reducing the cost. Moreover, since the laser divergence point only need be moved, continuous variability is easy and the configuration is easily adapted for automation.

It is acceptable to provide a scanning unit which can scan the laser beam toward a direction orthogonal to the optical axis of the condensing optical system.

In this case, since the scanning unit also scans the laser beam, the entire region of the medium can be observed without moving the medium side.

The laser divergence point moving unit may set the position of the laser divergence point based on wavefront data of the condensing optical system measured beforehand.

In this case, since the laser divergence point moving unit sets the position of the laser divergence point after considering wavefront data of the condensing optical system measured beforehand, such as wavefront data of the objective lens which forms part of the condensing optical system and wavefront data of the entire condensing optical system, the condensing performance of the laser beam and the observation performance can be further enhanced.

An observation optical system may be provided in coordination with the condensing optical system, and maintains a predetermined distance from a bottom face of the condensing optical system to the surface of the medium. The observation optical system may include an autofocus detecting unit or an autofocus mechanism.

In this case, since the observation optical system maintains the distance from the bottom face of the condensing optical system (bottom face of the objective lens) to the surface of the medium at a predetermined distance, when relatively moving the condensing optical system and the medium in the horizontal direction (i.e. when scanning), the depth from the medium surface can be accurately controlled to a desired depth.

The relative distance in the optical axis direction between the condensing optical system and the surface of the medium may be constant.

In this case, even if the depth in the medium where the laser beam is condensed changes, since the relative distance in the optical axis direction between the objective lens which forms part of the condensing optical system and the surface of the medium, that is, the work distance (WD), is constant, the apparatus configuration can be simplified and the observation speed can be increased.

In order to achieve the second object, this invention uses the following means.

An optical system according to a first aspect of this invention includes an emitting unit which emits a beam of light rays in a parallel state; a condensing optical system which condenses the beam; a first lens group which is arranged in the beam between the emitting unit and the condensing optical system and can move along the optical axis direction of the beam, the first lens group including one or more lenses; a second lens group which is securely arranged in the beam between the first lens group and the condensing optical system, and includes one or more lenses; and a moving unit which moves the first lens group in accordance with the distance to a position where the beam is condensed. A rear side focal length of the second lens group is arranged at least in the vicinity of an entrance pupil position of the condensing optical system.

According to this optical system, rays emitted in a parallel state from the emitting unit are refracted by the first lens group and the second lens group, and are therefore incident on the condensing optical system where they are condensed. At this time, the moving unit moves the first lens group in the optical axis direction, enabling the beam source position to be moved in the optical axis direction. That is, by moving the first lens group, the beam source position seen from the second lens group can be changed, and the actual beam source position seen from the condensing optical system can be changed.

Since the rays incident on the first lens group are in a parallel state, the intensity distribution in the pupil face can be kept constant. Therefore, change in the condensing performance can be suppressed.

Figure 11:
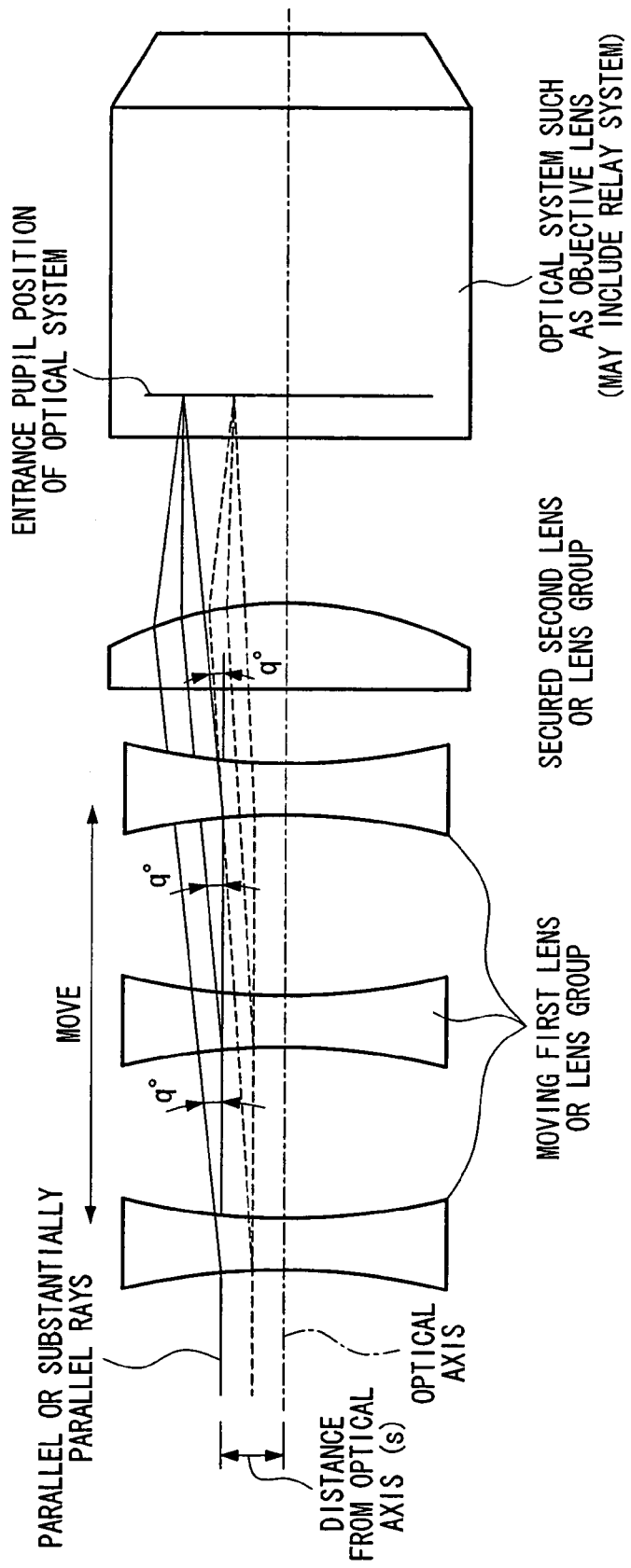
FIG. 11 is an explanatory diagram of effects of an optical system according to this invention, and illustrates the positional relationship between a first lens, a second lens, and a condensing optical system.

This will be explained more specifically with reference to FIG. 11. As shown in FIG. 11, a first lens (first lens group) is arranged in a beam of parallel rays. When the first lens moves along the optical axis, if the distance (s) from the optical axis of the rays which are incident on the first lens is constant, the angle (q) of the rays after they pass the first lens will not change (they remain parallel). These angle-unchanged (parallel) rays condense at (definitely pass) one point on the rear side focal face of the second lens (second lens group). Since the rear side focal point position of the second lens and the entrance pupil position of the condensing optical system are arranged such that they match, the parallel rays incident on the first lens always have the same diameter at the entrance pupil position of the condensing optical system regardless of the position of the first lens, and condense without blurring in the condensing optical system.

In other words, by moving the first lens group in accordance with the distance to the condensing position, the condensing position of the condensing optical system can be moved in the optical axis direction. Furthermore, since the second lens group ensures that the diameter of the rays incident on the condensing optical system does not change, change in the intensity at the condensing position and change in the intensity distribution on the pupil face, which are features of conventional systems, can be reduced to almost zero.

In FIG. 11, while change in the intensity at the condensing position and change in the intensity distribution on the pupil face can be reduced to almost zero by matching the rear side focal point position of the second lens (second lens group) with the entrance pupil position of the condensing optical system, the same effect can be obtained by arranging these two positions near each other (that is, arranging the rear side focal point position of the second lens at least in the vicinity of the entrance pupil position of the condensing optical system). This will be explained more specifically with reference to FIG. 12.

Figure 12:
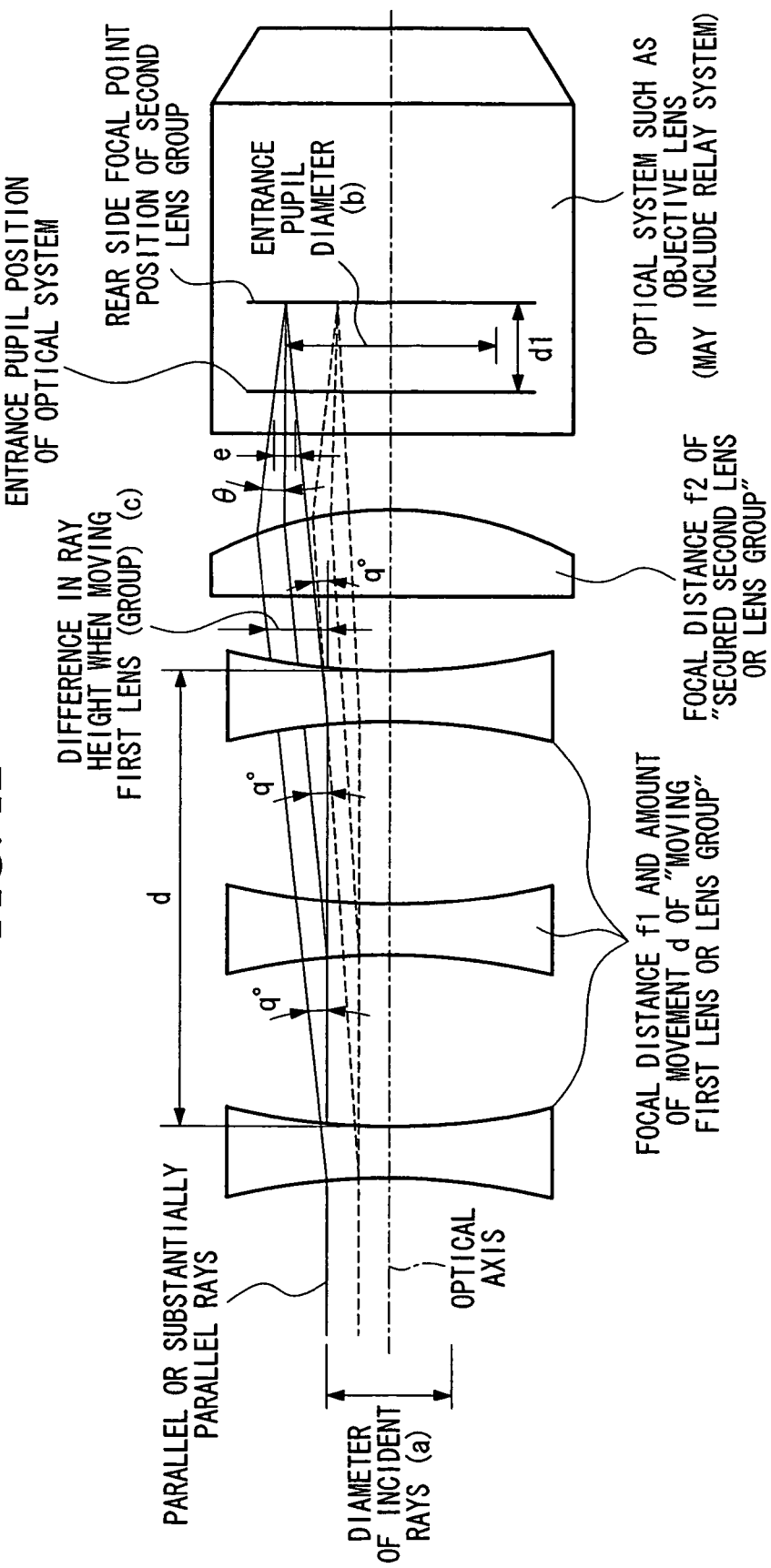
FIG. 12 is a diagram of the relationship between an entrance pupil position of the same condensing optical system and a rear side focal point position of the second lens.

As shown in FIG. 12, if d1 is the amount of deviation between the rear side focal point position of the second lens (second lens group) and the entrance pupil position of the condensing optical system, f2 is the focal point distance of the second lens, and x % is the fluctuation rate of the diameter of the rays which are incident on the condensing optical system after the first lens (first lens group) moves, then $$x = 100 \times (d1 \times d)/(f2^2).$$

This equation can be written as $d1 = (f2^2)/d \times (x/100)$.

When the rear side focal point position of the second lens matches the entrance pupil position of the condensing optical system, d1=0. That is, even if the first lens moves, the diameter of the rays incident on the condensing optical system does not change (x=0).

While this arrangement is best, the amount of fluctuation in the diameter of the rays can be maintained at $x \leq 20$ (equal to or less than ±10%) by ensuring that $d1 \leq 0.2 \times f2^2/d$.

Moreover, if $d1 \leq 0.1 \times f2^2/d$, the amount of fluctuation in the diameter of the rays can be maintained at $x \leq 10$ (equal to or less than ±5%).

Yet more preferably, if $d1 \leq 0.06 \times f2^2/d$, the amount of fluctuation in the diameter of the rays can be maintained at $x \leq 6$ (equal to or less than ±3%).

Moreover, since the position of the beam source can be changed merely by moving the first lens group, there is no need to move the condensing optical system, the stage, and the like in the optical axis direction in the conventional manner. Therefore, the configuration can be simplified and spherical aberration can be corrected easily without a time-consuming operation. In addition, since a special optical system such as an objective lens with a correction ring is not required, the configuration can be simplified while reducing the cost.

The condensing optical system may condense the beam in a medium, and the moving unit may move the first lens group in accordance with the refractive index of the medium where the beam is condensed and the distance from a surface of the medium to the condensing position.

In this case, since the moving unit moves the first lens group in accordance with the refractive index of the medium where the beam is condensed and the distance from the surface of the medium to the condensing position, the rays can be condensed more accurately at a desired depth from the surface of the medium. In addition, the amount of spherical aberration generated can be further suppressed. Therefore, the condensing performance can be enhanced.

The emitting unit may include a laser beam source which emits a laser beam.

An optical tweezers optical system including the optical system may be used.

When $|f|$ is the combined focal distance of the first lens group and the second lens group, the moving unit may move the first lens group to a position which satisfies the following equation.

$$1/|f| < 0.01$$

When f2 is the focal distance of the second lens group, the second lens group may satisfy the following equation.

$$f2 > 0$$

When f1 is the focal distance of the first lens group and f2 is the focal distance of the second lens group, the first lens group and the second lens group may satisfy the following equations.

$$f1 < 0$$

and $1 \leq |f2/f1| \leq 5$

When f1 is the focal distance of the first lens group and f2 is the focal distance of the second lens group, the first lens group and the second lens group may satisfy the following equations.

$$f1 > 0$$

and $0.5 \leq |f1/f2| \leq 2$

An optical system according to a second aspect of this invention includes a laser beam source which emits a laser beam; a collimating unit which collimates rays of the laser beam emitted from the laser beam source to collimated (parallel) rays; a condensing optical system which condenses the collimated laser beam in a medium and recondenses light from a condensing point; a scanning unit which can scan a focal point in the medium in a direction perpendicular to the optical axis direction of the laser beam; a photodetector which is arranged at a position conjugate with the laser beam source and detects the beam recondensed by the condensing optical system; a first lens group which is arranged in the beam between the emitting unit and the condensing optical system and can move along the optical axis direction of the beam, the first lens group including one or more lenses; and a moving unit which moves the first lens group in accordance with the refractive index of the medium in which the laser beam is condensed, and the distance from the surface of the medium to a position where the beam is condensed. A rear side focal length of the second lens group is arranged at least in the vicinity of an entrance pupil position of the condensing optical system.

According to this optical system, the laser beam emitted from the laser beam source is converted to parallel rays by the collimating unit and is incident on the first lens group. After being refracted by the first lens group and the second lens group, the beam is condensed in the medium and then recondensed by the condensing optical system, whereafter it is detected by the photodetector. At this time, the moving unit moves the first lens group in the optical axis direction, enabling the position of the beam source to be moved in the optical axis direction. That is, the position of the beam source seen from the second lens group can be changed by moving the first lens group, and in addition, the actual position of the beam source seen from the condensing optical system can be changed. This makes it possible to significantly suppress spherical aberration in accordance with the depth in the medium.

Since the beam of rays incident on the first lens group is in a parallel state, even if the first lens group is moved in the optical axis direction and the rays are refracted at each position, they are emitted at the same refraction angle.

Furthermore, since rear side focal point position of the second lens group is arranged at least in the vicinity of the entrance pupil position of the condensing optical system, the light which is incident on the second lens group is reliably condensed by the condensing optical system. Since the position of incidence to the second lens group can be changed by moving the first lens group in accordance with the distance to the condensing position, the amount of spherical aberration generated at the desired condensing point can be significantly suppressed. The second lens group can reliably make the rays incident on the condensing optical system without changing them, thereby suppressing change in the intensity and change in the intensity distribution in the pupil face, which are features of conventional optical systems. That is, the amount of light which is incident on the condensing optical system can be kept constant, and so can the intensity distribution in the pupil face, making it possible to suppress change in the brightness and the condensing performance. Therefore, change in the condensing performance can be suppressed.

Since the amount of spherical aberration generated can be significantly suppressed, an accurate observation image can be obtained by recondensing light with little aberration. Therefore, the medium can be observed with high precision. Since the scanning unit scans the condensing point, it is possible to observe the entire region of the medium.

Moreover, since the position of the beam source can be changed merely by moving the first lens group, there is no need to move the condensing optical system, the stage, and the like in the optical axis direction in the conventional manner. Therefore, the configuration can be simplified and spherical aberration can be corrected easily without a time-consuming operation. In addition, since a special optical system such as a conventional objective lens with a correction ring is not required, the configuration can be simplified while reducing the cost.

The scanning unit may be a galvanometer mirror.

An optical system according to a third aspect of this invention includes a laser beam source which emits a laser beam; a collimating unit which collimates rays of the laser beam emitted from the laser beam source to parallel rays; a condensing optical system which condenses the collimated laser beam in a medium and recondenses light from a condensing point; a photodetector which is arranged at a position conjugate with the laser beam source and detects the beam recondensed by the condensing optical system; a first lens group which is arranged in the beam between the emitting unit and the condensing optical system and can move along the optical axis direction of the beam, the first lens group including one or more lenses; a second lens group which is securely arranged in the beam between the first lens group and the condensing optical system, and includes one or more lenses; and a moving unit which moves the first lens group in accordance with the refractive index of the medium in which the laser beam is condensed, and the distance from the surface of the medium to a position where the beam is condensed. A rear side focal length of the second lens group is arranged at least in the vicinity of an entrance pupil position of the condensing optical system.

The first lens group and the second lens group may be configured such that they can be inserted/removed from the optical path.

The relative distance in the optical axis direction between the condensing optical system and the surface of the medium may be constant.

An aberration-correcting optical system according to a first aspect of this invention condenses a beam of rays from a beam source, and includes a plurality of lenses which can be exclusively inserted/removed to/from an optical path and satisfy the following equation.

$$2(d^2+l \times f-l \times d)NA = f \times a$$

where d is the distance from an entrance pupil position of a condensing optical system to the plurality of lenses, l is the distance from the entrance pupil position of the condensing optical system to the beam source position, f is the focal length of the plurality of lenses, NA is the numerical aperture of the beam source (the numerical aperture seen from a condensing lens), and a is the entrance pupil diameter of the condensing optical system.

A laser scanning optical system according to a first aspect of this invention includes a plurality of lenses which can be inserted/removed to/from an optical path of a converging/diverging optical system and satisfy the following equation.

$$2(d^2+l \times f-l \times d)NA = f \times a$$

where d is the distance from an entrance pupil position of a condensing optical system to the plurality of lenses, l is the distance from the entrance pupil position of the condensing optical system to the beam source position, f is the focal length of the plurality of lenses, NA is the numerical aperture of the beam source (the numerical aperture seen from a condensing lens), and a is the entrance pupil diameter of the condensing optical system.

A laser scanning microscope of this invention may include the laser scanning optical system described above.

An optical tweezers according to a first aspect of this invention includes a plurality of lenses which can be inserted/removed to/from an optical path of a converging/diverging optical system and satisfy the following equation.

$$2(d^2+l \times f-l \times d)NA = f \times a$$

where d is the distance from an entrance pupil position of a condensing optical system to the plurality of lenses, l is the distance from the entrance pupil position of the condensing optical system to the beam source position, f is the focal length of the plurality of lenses, NA is the numerical aperture of the beam source (the numerical aperture seen from a condensing lens), and a is the entrance pupil diameter of the condensing optical system.

An aberration-correcting optical system according to a second aspect of this invention includes a condensing optical system including a beam source which emits a beam of collimated rays and an optical system which condenses the collimated rays. The aberration-correcting optical system includes a plurality of lenses which can be exclusively inserted/removed to/from an optical path and satisfy the following equation.

$$b(f-d)/f = a$$

where b is the diameter of the collimated beam from the beam source, d is the distance from an entrance pupil position of a condensing optical system to the plurality of lenses, f is the focal length of the plurality of lenses, and a is the entrance pupil diameter of the condensing optical system.

A laser scanning optical system according to a second aspect of this invention includes a plurality of lenses which can be exclusively inserted/removed to/from an optical path of a beam of collimated rays and satisfy the following equation.

$$b(f-d)/f = a$$

where b is the diameter of the collimated beam from the beam source, d is the distance from an entrance pupil position of a condensing optical system to the plurality of lenses, f is the focal length of the plurality of lenses, and a is the entrance pupil diameter of the condensing optical system.

An optical tweezers according to this invention includes a plurality of lenses which can be exclusively inserted/removed to/from an optical path of a beam of collimated rays and satisfy the following equation.

$$b(f-d)/f=a$$

where b is the diameter of the collimated beam from the beam source, d is the distance from an entrance pupil position of a condensing optical system to the plurality of lenses, f is the focal length of the plurality of lenses, and a is the entrance pupil diameter of the condensing optical system.

Advantageous Effects of the Invention

According to the condensing optical system of the present invention, a laser divergence point moving unit moves a laser divergence point along the optical axis of a laser beam in accordance with the refractive index of a medium where the beam is condensed and the distance from the surface of the medium to the condensing position, thereby enabling the amount of spherical aberration generated at positions of different depths in the medium to be significantly suppressed. Therefore, the laser beam can be efficiently condensed at a desired depth in the medium, and the condensing performance can be enhanced. Since an accurate observation image can be obtained by recondensing light with little spherical aberration, the medium can be observed with high precision. In particular, since only the laser divergence point is moved, spherical aberration can be corrected easily without consuming time in the conventional manner. In addition, since a special optical system is not required, the configuration can be simplified while reducing the cost.

Furthermore according to the optical system of the present invention, since the position of the rays which are incident on the second lens group (i.e. the actual position of the beam source seen from the condensing optical system) is changed merely by moving the first lens group in accordance with the distance to the condensing position in the medium, the amount of spherical aberration generated at a desired condensing position can be significantly suppressed. The rear side focal length of the second lens group is matched to the entrance pupil position of the condensing optical system, whereby the diameter of the beam incident on the entrance pupil of the condensing optical system does not change. This suppresses change in the intensity and change in the intensity distribution in the pupil face, which are features of conventional optical systems. Therefore, change in the condensing performance can be suppressed.

Moreover, since the beam source position can be changed merely by moving the first lens group, the configuration can be simplified and spherical aberration can be corrected easily without consuming time.

The present invention also includes the following.

Note 1

An optical system including:

an emitting unit which emits a beam of light rays in a parallel state;

a condensing optical system which condenses the beam;

a first lens group which is arranged in the beam between the emitting unit and the condensing optical system and can move along the optical axis direction of the beam, the first lens group including one or more lenses;

a second lens group which is securely arranged in the beam between the first lens group and the condensing optical system, and includes one or more lenses; and a moving unit which moves the first lens group in accordance with the distance to a position where the beam is condensed, wherein a rear side focal length of the second lens group is arranged at least in the vicinity of an entrance pupil position of the condensing optical system.

Note 2

The optical system according to Note 1, wherein the condensing optical system condenses the beam in a medium, and the moving unit moves the first lens group in accordance with the refractive index of the medium where the beam is condensed and the distance from a surface of the medium to the condensing position.

Note 3

The optical system according to Note 1 or 2, wherein the emitting unit includes a laser beam source which emits a laser beam.

Note 4

An optical system including:

a laser beam source which emits a laser beam;

a collimating unit which collimates rays of the laser beam emitted from the laser beam source to parallel rays;

a condensing optical system which condenses the collimated laser beam in a medium and recondenses light from a condensing point;

a photodetector which is arranged at a position conjugate with the laser beam source and detects the beam recondensed by the condensing optical system;

a first lens group which is arranged in the beam between the emitting unit and the condensing optical system and can move along the optical axis direction of the beam, the first lens group including one or more lenses;

a second lens group which is securely arranged in the beam between the first lens group and the condensing optical system, and includes one or more lenses; and a moving unit which moves the first lens group in accordance with the refractive index of the medium where the laser beam is condensed, and the distance from a surface of the medium to the condensing position, wherein a rear side focal length of the second lens group is arranged at least in the vicinity of an entrance pupil position of the condensing optical system.

Note 5

An optical system including:

a laser beam source which emits a laser beam;

a collimating unit which collimates rays L of the laser beam emitted from the laser beam source to parallel rays;

a condensing optical system which condenses the collimated laser beam in a medium and recondenses light from a condensing point;

a scanning unit which can scan a focal point in the medium in a direction perpendicular to the optical axis direction of the laser beam;

a photodetector which is arranged at a position conjugate with the laser beam source and detects the beam recondensed by the condensing optical system;

a first lens group which is arranged in the beam between the emitting unit and the condensing optical system and can move along the optical axis direction of the beam, the first lens group including one or more lenses;

a second lens group which is securely arranged in the beam between the first lens group and the condensing optical system, and includes one or more lenses; and a moving unit which moves the first lens group in accordance with the refractive index of the medium where the laser beam is condensed, and the distance from a surface of the medium to the condensing position, wherein a rear side focal length of the second lens group is arranged at least in the vicinity of an entrance pupil position of the condensing optical system.

Note 6

The optical system according to Note 5, wherein the scanning unit is a galvanometer mirror.

Note 7

The optical system according to one of Notes 4 to 6, wherein the first lens group and the second lens group can be inserted/removed from the optical path.

Note 8

The optical system according to one of Notes 4 to 7, wherein the relative distance in the optical axis direction between the condensing optical system and the surface of the medium is constant.

Note 9

An optical tweezers optical system including the optical system according to one of Notes 1 to 3.

Note 10

The optical system according to one of Notes 1 to 8, wherein when $|f|$ is the combined focal distance of the first lens group and the second lens group, the moving unit moves the first lens group to a position which satisfies the following equation.

$$1/|f|<0.01$$

Note 11

The optical system according to one of Notes 1 to 8, wherein when f2 is the focal distance of the second lens group, the second lens group satisfies the following equation.

$$f2>0$$

Note 12

The optical system according to one of Notes 1 to 8, wherein when f1 is the focal distance of the first lens group and f2 is the focal distance of the second lens group, the first lens group and the second lens group satisfy the following equations.

$$f1<0$$

$$\text{and } 1 \leq |f2/f1| \leq 5$$

Note 13

The optical system according to one of Notes 1 to 8, wherein when f1 is the focal distance of the first lens group and f2 is the focal distance of the second lens group, the first lens group and the second lens group satisfy the following equations.

$$f1>0$$

$$\text{and } 0.5 \leq |f1/f2| \leq 2$$

Note 14

An aberration-correcting optical system which condenses a beam of rays from a beam source, and includes a plurality of lenses which can be exclusively inserted/removed to/from an optical path and satisfy the following equation $$2(d^2+l \times f - l \times d)NA = f \times a$$

where d is the distance from an entrance pupil position of a condensing optical system to the plurality of lenses, l is the distance from the entrance pupil position of the condensing optical system to the beam source position, f is the focal length of the plurality of lenses, NA is the numerical aperture of the beam source (the numerical aperture seen from a condensing lens), and a is the entrance pupil diameter of the condensing optical system.

Note 15

A laser scanning optical system including a plurality of lenses which can be inserted/removed to/from an optical path of a converging/diverging optical system and satisfy the following equation.

$$2(d^2+l \times f - l \times d)NA = f \times a$$

where d is the distance from an entrance pupil position of a condensing optical system to the plurality of lenses, l is the distance from the entrance pupil position of the condensing optical system to the beam source position, f is the focal length of the plurality of lenses, NA is the numerical aperture of the beam source (the numerical aperture seen from a condensing lens), and a is the entrance pupil diameter of the condensing optical system.

Note 16

A laser scanning microscope including the laser scanning optical system according to Note 15.

Note 17

An optical tweezers optical system including a plurality of lenses which can be inserted/removed to/from an optical path of a converging/diverging optical system and satisfy the following equation.

$$2(d^2+l \times f - l \times d)NA = f \times a$$

where d is the distance from an entrance pupil position of a condensing optical system to the plurality of lenses, l is the distance from the entrance pupil position of the condensing optical system to the beam source position, f is the focal length of the plurality of lenses, NA is the numerical aperture of the beam source (the numerical aperture seen from a condensing lens), and a is the entrance pupil diameter of the condensing optical system.

Note 18

An aberration-correcting optical system including a condensing optical system including a beam source which emits a beam of collimated rays, and an optical system which condenses the collimated rays, wherein a plurality of lenses which can be exclusively inserted/removed to/from an optical path and satisfy the following equation are arranged.

$$b(f-d)/f = a$$

where b is the diameter of the collimated beam from the beam source, d is the distance from an entrance pupil position of a condensing optical system to the plurality of lenses, f is the focal length of the plurality of lenses, and a is the entrance pupil diameter of the condensing optical system.

Note 19

A laser scanning optical system including a plurality of lenses which can be exclusively inserted/removed to/from an optical path of a beam of collimated rays and satisfy the following equation.

$$b(f-d)/f=a$$

where b is the diameter of the collimated beam from the beam source, d is the distance from an entrance pupil position of a condensing optical system to the plurality of lenses, f is the focal length of the plurality of lenses, and a is the entrance pupil diameter of the condensing optical system.

Note 20

An optical tweezers including a plurality of lenses which can be exclusively inserted/removed to/from an optical path of a beam of collimated rays and satisfy the following equation.

$$b(f-d)/f=a$$

where b is the diameter of the collimated beam from the beam source, d is the distance from an entrance pupil position of a condensing optical system to the plurality of lenses, f is the focal length of the plurality of lenses, and a is the entrance pupil diameter of the condensing optical system.

INDUSTRIAL APPLICABILITY OF THE PRESENT INVENTION

According to the condensing optical system of the present invention, a laser divergence point moving unit moves a laser divergence point along the optical axis of a laser beam in accordance with the refractive index of a medium where the beam is condensed and the distance from the surface of the medium to the condensing position, thereby enabling the amount of spherical aberration generated at positions of different depths in the medium to be significantly suppressed. Therefore, the laser beam can be efficiently condensed at a desired depth in the medium, and the condensing performance can be enhanced. Since an accurate observation image can be obtained by recondensing light with little spherical aberration, the medium can be observed with high precision. In particular, since only the laser divergence point is moved, spherical aberration can be corrected easily without consuming time in the conventional manner. In addition, since a special optical system is not required, the configuration can be simplified while reducing the cost.

Furthermore according to the optical system of the present invention, since the position of the rays which are incident on the second lens group (i.e. the actual position of the beam source seen from the condensing optical system) is changed merely by moving the first lens group in accordance with the distance to the condensing position in the medium, the amount of spherical aberration generated at a desired condensing position can be significantly suppressed. The rear side focal length of the second lens group is matched to the entrance pupil position of the condensing optical system, whereby the diameter of the beam incident on the entrance pupil of the condensing optical system does not change. This suppresses change in the intensity and change in the intensity distribution in the pupil face, which are features of conventional optical systems. Therefore, change in the condensing performance can be suppressed.

Moreover, since the beam source position can be changed merely by moving the first lens group, the configuration can be simplified and spherical aberration can be corrected easily without consuming time.

What is claimed is:

1. An optical system comprising:

a laser beam source which emits a laser beam;

a condensing optical system arranged between the laser beam source and a medium, the condensing optical system condensing the laser beam to a position inside the medium and recondensing light from a condensing point;

a photodetector which is arranged at a position conjugate with the laser beam source and detects the light recondensed by the condensing optical system; and a laser divergence point moving unit which moves the position of a laser divergence point of the laser beam along an optical axis of the laser beam in accordance with the refractive index of the medium in which the laser beam is condensed and the distance from a surface of the medium to a position inside the medium, where the laser beam is condensed.

2. The optical system according to claim 1, further comprising a scanning unit which can scan the laser beam toward a direction orthogonal to the optical axis of the condensing optical system.

3. The optical system according to claim 1, wherein the laser divergence point moving unit sets the position of the laser divergence point based on wavefront data of the condensing optical system measured beforehand.

4. The optical system according to claim 1, further comprising an observation optical system which is provided in coordination with the condensing optical system, and maintains a predetermined distance from a bottom face of the condensing optical system to the surface of the medium, the observation optical system including an autofocus detecting unit or an autofocus mechanism.

5. The optical system according to claim 1, wherein the relative distance in the optical axis direction between the condensing optical system and the surface of the medium is constant.

6. The optical system according to claim 1, further comprising a collimating unit which collimates rays of the laser beam emitted from the laser beam source to parallel rays, wherein the laser divergence point moving unit is provided with:

a first lens group which is arranged in rays between the collimating unit and the condensing optical system so as to be movable along a optical axis direction of the parallel rays;

a second lens group which is securely arranged in rays between the first lens group and the condensing optical system; and a moving unit which moves the first lens group.

7. The optical system according to claim 6, wherein a back focal point of the second lens group is provided at least in the vicinity of an entrance pupil position of the condensing optical system.

8. The optical system according to claim 6, wherein
the first lens group and the second lens group can be inserted into or removed from the optical path.

9. The optical system according to claim 6, wherein
when |f| is the combined focal distance of the first lens group and the second lens group, the moving unit moves the first lens group to a position which satisfies the following equation $$1/|f| < 0.01.$$

10. The optical system according to claim 6, wherein
when f2 is the focal distance of the second lens group, the second lens group satisfies the following equation $$f2 > 0.$$

11. The optical system according to claim 6, wherein
when f1 is the focal distance of the first lens group and f2 is the focal distance of the second lens group, the first lens group and the second lens group satisfy the following equations $$f1 < 0$$

and $$1 \leq |f2/f1| \leq 5.$$

12. The optical system according to claim 6, wherein
when f1 is the focal distance of the first lens group and f2 is the focal distance of the second lens group, the first lens group and the second lens group satisfy the following equations $$f1 > 0$$

and $0.5 \leq |f1/f2| \leq 2.$

13. The optical system according to claim 1, wherein
the laser divergence point moving unit comprises:
a beam source moving unit which moves the laser beam source along the optical axis; and
a photodetector moving unit which moves the photodetector along the optical axis in synchronism with the beam source moving unit.

14. The optical system according to claim 1, wherein
the laser divergence point moving unit moves the laser beam source and the photodetector together along the optical axis.

15. The optical system according to claim 1, wherein
the laser divergence point moving unit includes at least two mirrors provided in the condensing optical system, and moves these mirrors along the optical axis.

16. The optical system according to claim 1, wherein
the laser divergence point moving unit includes a plurality of lenses which can be exclusively inserted into or removed from an optical path and satisfy the following equation $$2(d^2 + 1 \times f - 1 \times d)NA = f \times a$$

where d is the distance from an entrance pupil position of a condensing optical system to the plurality of lenses,
l is the distance from the entrance pupil position of the condensing optical system to the beam source position,
f is the focal length of the plurality of lenses,
NA is the numerical aperture of the beam source (the numerical aperture seen from a condensing lens), and
a is the entrance pupil diameter of the condensing optical system.

17. The optical system according to claim 1, wherein
the laser divergence point moving unit includes a plurality of lenses which can be exclusively inserted into or removed from an optical path and satisfy the following equation $$b(f-d)/f = a$$

where b is the diameter of the collimated beam from the beam source,
d is the distance from an entrance pupil position of a condensing optical system to the plurality of lenses,
f is the focal length of the plurality of lenses, and
a is the entrance pupil diameter of the condensing optical system.

18. An aberration-correcting optical system comprising the optical system according to claim 1.

19. A laser scanning optical system comprising the optical system according to claim 1.

20. A microscope comprising the optical system according to claim 1.

21. An optical tweezers optical system comprising the optical system according to claim 1.

* * * * *